(12) United States Patent
Suzuki et al.

(10) Patent No.: US 7,672,053 B2
(45) Date of Patent: Mar. 2, 2010

(54) PRINT MEDIUM

(75) Inventors: Katsuhito Suzuki, Matsumoto (JP);
Fumiaki Mukaiyama, Ina (JP); Yoichi Tanaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/682,826

(22) Filed: Mar. 6, 2007

(65) Prior Publication Data

US 2007/0263296 A1 Nov. 15, 2007

(30) Foreign Application Priority Data

| Apr. 3, 1930 | (JP) | ............................. 2006-101670 |
| Mar. 7, 2006 | (JP) | ............................. 2006-060570 |
| Mar. 15, 2006 | (JP) | ............................. 2006-070698 |

(51) Int. Cl.
*G02B 27/10* (2006.01)

(52) U.S. Cl. .................................... 359/619

(58) Field of Classification Search ................ 359/624, 359/618, 619, 710, 455, 463
See application file for complete search history.

(56) References Cited

U.S. PATENT DOCUMENTS 4,497,126 A * 2/1985 Dejean .................... 40/124.02
7,359,120 B1 * 4/2008 Raymond et al. ........... 359/626
2006/0013993 A1 * 1/2006 Havive et al. ............... 428/131

FOREIGN PATENT DOCUMENTS

| CN | 1304836 A | 7/2001 |
| JP | 61-192873 | 12/1986 |
| JP | 3001917 U | 6/1994 |
| JP | 11-192696 | 7/1999 |
| JP | 2000-190668 | 7/2000 |
| JP | 2001-105723 | 4/2001 |
| JP | 2002-365405 | 12/2002 |
| JP | 3471930 | 9/2003 |
| JP | 2004-177727 | 6/2004 |
| JP | 2004-192406 | 7/2004 |
| JP | 2005-196152 | 7/2005 |
| JP | 2005-196153 | 7/2005 |
| JP | 2007-4014 | 1/2007 |

* cited by examiner

*Primary Examiner*—Scott J Sugarman
*Assistant Examiner*—Vipin M Patel
(74) *Attorney, Agent, or Firm*—Workman Nydegger

(57) ABSTRACT

A print medium of the present invention has a structure in which a substrate 30 has an extending portion 10b extending from the portion fixed to a lenticular sheet 10a to the right in the drawing and adjacent to the rectangular lenticular sheet 10a. Printing "parallactic images", "an addressee", and "a fold" on an ink permeating layer 50, a print paper 60, and the ink permeating layer 50 of the print medium 10, respectively, and folding the extending portion 10b with respect to the "fold" facilitates bonding the portion on which the addressee is printed to the back surface of the lenticular sheet 10a.

15 Claims, 16 Drawing Sheets

PRINT MEDIUM

TECHNICAL FIELD

The present invention relates to a print medium having a rectangular lens sheet whose surface has a predetermined shape.

BACKGROUND ART

Conventional method for enjoying three-dimensional images include a method of using a lens sheet whose surface has a lenticular lens having multiple cylindrical convex lenses arrayed in parallel (hereinafter, also referred to as a lenticular sheet) and a method called integral photography using a fly eye lens having multiple convex lenses arrayed in a plane.

These methods provide viewers with three-dimensional images by arranging images for a right eye and a left eye in corresponding positions of the multiple lenses, that is, parallactic images. Therefore, unless the parallactic images are arranged in correct positions corresponding to the lenses, no three-dimensional images are provided.

Accordingly, in order to locate parallactic images in the correct positions of the lenses, a technique is disclosed for printing parallactic images directly on a lenticular sheet (for example, refer to Patent Document 1). Another technique is disclosed for printing parallactic images in the corresponding positions of part of the lenses of a lenticular sheet left on the print surface (for example, refer to Patent Document 2).

In addition to the printing techniques disclosed in Patent Documents 1 and 2, the cost reduction of lenticular sheets and the spread of printers have allowed creators to easily print parallactic images on print media to generate three-dimensional images. Moreover, this allows not only the creators to view the parallactic images but also to send print media on which parallactic images are printed to other persons as postcards.

When the created lenticular sheets are sent as postcards, in such circumstances, the technique disclosed in Patent Document 1 requires writing an addressee on the lenticular sheet on which parallactic images are printed. When an addressee is written, the addressee is overwritten on the parallactic images. To prevent it, it is necessary to bond a sheet of paper such that overwritten addressee has no effect on the parallactic images onto the parallactic images with an adhesive while registering the paper with the lenticular sheet. For such bonding work, the creator must take care not to stain the parallactic-image printed surface or not to peel off the printed parallactic images. This will trouble the creator with a significant load.

The technique disclosed in Patent Document 2 can not print parallactic images on the lenticular lens left to the surface on which parallactic images are to be printed. Therefore, when the lenticular sheet is sent as a postcard, the whole surface of the postcard cannot be used for three-dimensional images.

[Patent Document 1] Japanese Patent No. 3471930
[Patent Document 2] JP-A-2005-196153

DISCLOSURE OF INVENTION

The present invention is made in view of the above problems. Accordingly, an object of the invention is to provide a print medium having a lens sheet, over which parallactic images can be printed without time-consuming labor, and which can be sent as a postcard or the like.

A print medium according to the invention includes a rectangular lens sheet whose front surface has a predetermined lens shape. The print medium includes: a thin-plate substrate fixed to aback surface of the rectangular lens sheet and having and extending portion extending outward beyond the rectangular lens sheet. The extending portion overlaps the back surface of the lens sheet when the substrate is folded with respect to one side of the rectangular lens sheet.

With this structure, when the substrate is folded, it can be put all over the back surface of the lens sheet. Thus, when parallactic images are directly printed on the area of the substrate opposite to the lens sheet and on the back of the lens sheet, and an addressee is directly written on the area of the extending portion and on the same side of the lens sheet, and then the substrate is folded so that the extending portion is placed on the lens sheet, the parallactic images can be viewed from the front surface of the lens sheet and the addressee can be viewed from the back surface of the lens sheet. Thus, the print medium can be used as a postcard.

In this case, the substrate may have a first print surface opposite to the surface fixed to the lens sheet and in the range of the back surface of the lens sheet.

This allows a print surface for printing parallactic images to be formed on the back of the lens sheet, thereby reducing displacement between the lens sheet and the parallactic images. Moreover, since the parallactic images can be printed on a print surface suitable for parallactic images not directly on the substrate, the printed parallactic images can be improved in quality.

The substrate may have a second print surface adjacent to the surface fixed to the lens sheet and on the extending portion of the substrate.

This allows an addressee to be written or printed directly on a print surface suitable for addressing when the lens sheet is used as a postcard not directly on the substrate, thus allowing preferable addressing as a postcard.

The substrate may have a bonding layer opposite to the surface fixed to the lens sheet and on the extending portion of the substrate.

This allows the extending portion to be bonded to the back surface of the lens sheet by the bonding layer when the substrate is folded. Therefore, the creator can send the recording medium as a postcard without time-consuming work such as bonding the extending portion to the back surface of the lens sheet with another adhesive.

The first print surface may have at least an absorbing layer that absorbs print ink.

With this structure, when parallactic images are printed with a specified ink, the ink can be held on the print surface with stability. This can prevent degradation of the parallactic images formed with the ink.

The predetermined lens shape of the print medium of the invention may be a lenticular lens having a large number of cylindrical convex lenses arrayed in parallel.

The lenticular lens is desirable as a predetermined lens shape because it can easily form a three-dimensional image in combination with parallactic images.

The extending portion may extend outward from the closest side of the four sides of the rectangular lens sheet parallel to the cylinder axis of the convex lens.

For example, a printer is configured to determine the pitch of the convex lenses of the lenticular lens and to print parallactic images according to the determined pitch when printing an addressee on the second print surface of the extending portion. In this case, when the extending portion extends outward from the closest side of the four sides of the rectangular lens sheet parallel to the cylinder axis of the convex lens, the pitch of the convex lenses can be determined with high accuracy, thereby preventing the displacement between the convex lenses and the parallactic images.

The substrate of the print medium of the invention may have a fold serving as a reference for folding the substrate.

The first print surface of the print medium of the invention may have a fold serving as a reference for folding the substrate.

The second print surface of the print medium of the invention may have a fold serving as a reference for folding the substrate.

This allows the substrate to be folded with reference to the fold when the substrate is folded onto the back surface of the lens sheet, thus reducing the load of the folding operation to reduce the work of the creator.

The extending portion of the print medium of the invention may have: (1) a first print surface opposite to the surface fixed to the lens sheet; and (2) a second print surface adjacent to the surface fixed the lens sheet.

This allows the extending portion to be placed over the entire back surface of the lens sheet by folding the substrate. Thus, when parallactic images are directly printed on the first print surface on the back of the extending portion opposite to the lens sheet, and an addressee is written on the second print surface on the front of the extending portion and on the same side of the lens sheet, and then the substrate is folded so that the extending portion is placed on the lens sheet, the parallactic images can be viewed from the front surface of the lens sheet and the addressee can be viewed from the back surface of the lens sheet. Thus, the print medium can be used as a postcard having parallactic images.

The substrate of the print medium of the invention may have a bonding layer opposite to the surface fixed to the lens sheet and in the range of the back surface of the lens sheet.

This allows the extending portion to be bonded to the back surface of the lens sheet by the bonding layer when the substrate is folded. Therefore, the creator can send the recording medium as a postcard without time-consuming work such as bonding the extending portion to the back surface of the lens sheet with another adhesive.

A print medium of the invention includes a rectangular lens sheet whose front surface has a predetermined lens shape. The print medium includes: a thin-plate substrate having an extending portion fixed to the back surface having no lens and extending outward beyond the range of the back surface of the lens sheet. The substrate has on the surface opposite to the surface fixed to the lens sheet: (1) a first print surface in the range of the back surface of the lens sheet; and (2) a second print surface on the extending portion of the substrate.

This arrangement allows a print surface for printing parallactic images to be formed on the area of the substrate corresponding to the back of the lens sheet, thereby reducing displacement between the lens sheet and the parallactic images. Moreover, since the parallactic images can be printed on the print surface suitable for parallactic images not directly on the substrate, the printed parallactic images can be improved in quality.

Moreover, this arrangement allows an addressee to be written or printed on a print surface formed on the extending portion not directly on the substrate when the lens sheet is used as a postcard, thus allowing preferable addressing as a postcard.

This arrangement also allows both the parallactic images and an addressee to be printed on the respective print surfaces on the same surface of the substrate opposite to the lens sheet, thereby allowing the parallactic images and the addressee to be printed at the same time.

In this case, the first print surface may have at least a first ink absorbing layer that absorbs print ink.

With this arrangement, when parallactic images are printed with a specified ink, the ink can be held on the print surface with stability. Thus, degradation of the parallactic images formed with the ink can be prevented.

The second print surface may have at least a second ink absorbing layer that absorbs print ink.

With this structure, when an addressee is printed on the second print surface formed on the extending portion with a specified ink, the ink can be held on the print surface with stability. Thus, degradation of the addressee formed with the ink can be prevented.

BRIEF DESCRIPTION OF THE DRAWINGS

The above and other objects, features, and advantages of the invention will be apparent more fully from the following description of the preferred embodiments of the invention taken in connection with the accompanying drawings.

BEST MODE FOR CARRYING OUT THE INVENTION

A print media according to the invention will be described with reference to embodiments.

First Embodiment

Figure 1:
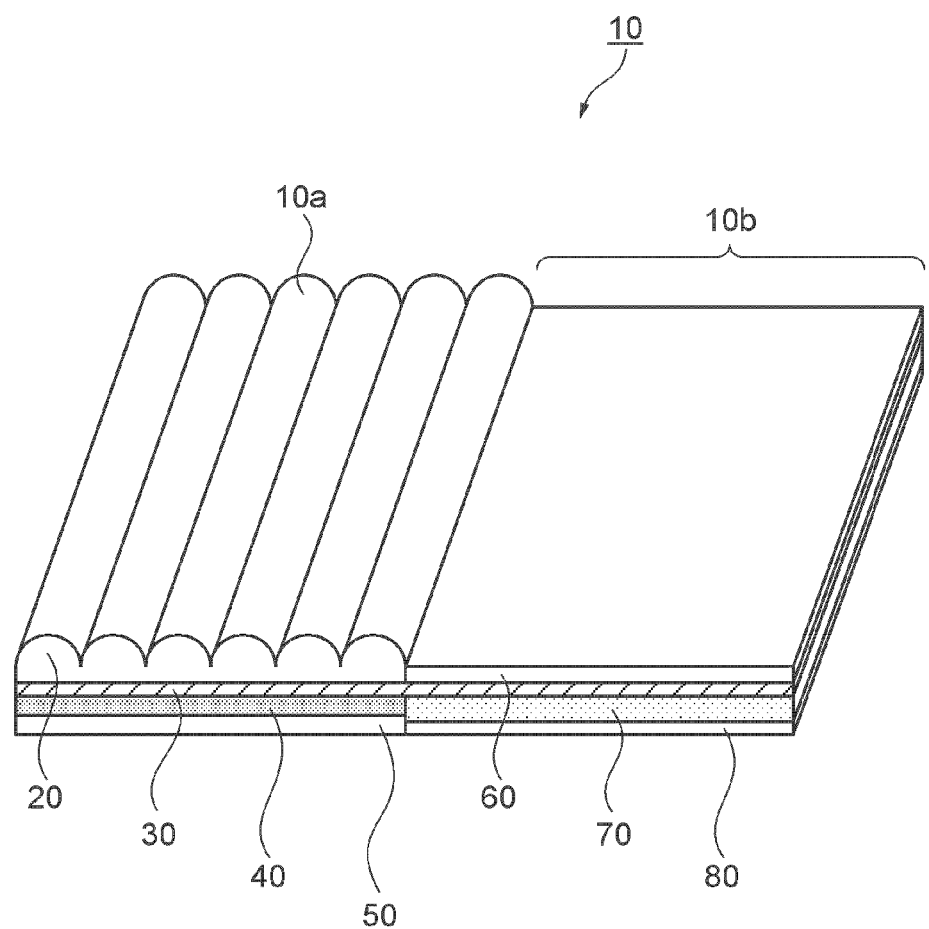
FIG. 1 is a schematic diagram of a print medium according to a first embodiment.

A print medium 10 according to a first embodiment of the invention will be described with reference to FIG. 1. FIG. 1 is a schematic diagram illustrating the components of the print medium 10. The print medium 10 includes a rectangular lenticular sheet 10a having multiple cylindrical convex lenses 20 formed on the front surface (above in the drawing), a substrate 30, an ink absorbing layer 40, an ink permeating layer 50, a bonding layer 70, a release sheet 80, and a sheet of print paper 60.

In the first embodiment, assume that the cylinder axis of each convex lens 20 is parallel to the long side of the rectangular lenticular sheet 10a. For the sake of simplification of description, we assume that the lenticular sheet has six cylindrical convex lenses 20. A lenticular sheet having convex lenses 20 at a pitch of 30 to 180 LPI (lens per inch) is generally used as the lenticular sheet 10a, and thus the lenticular sheet 10a actually has convex lenses of this number.

The lenticular sheet 10a is formed of a transparent resin material for use in lenses, such as polyethylene terephthalate (PET), polyethylene terephthalate modified with glycol (PETG), amorphous polyethylene terephthalate (APET), polypropylene (PP), polystyrene (PS), polyvinyl chloride (PVC), acryl, ultraviolet (UV)-cured resin, polycarbonate (PC) resin, or polymethyl methacrylate (PMMA) resin, whose overall back surface (the below in the drawing) is firmly fixed to the substrate 30. The fixation is made of a known material and by a known method such as welding or bonding, depending on the material of the substrate 30; any fixation method can be adopted as long as it can fix the lenticular sheet 10a and the substrate 30 together with transparency.

The substrate 30 is made of a transparent material such as a PETG resin. Of course, it may be made of a normal PET resin; any transparent material will do as long as it allows parallactic images formed on the ink absorbing layer 40, to be described later, to be viewed from the lenticular sheet 10a side and can be folded at a fold, to be described later.

The substrate 30 has the ink absorbing layer 40 on the side opposite to the lenticular sheet 10a and corresponding to the back surface of the lenticular sheet 10a. The ink absorbing layer 40 is a component for absorbing ink, which is ejected to print parallactic images corresponding to the convex lenses, to fix the ink in the ejected positions. The ink absorbing layer 40 is made of fine particles of hydrophilic polymer resin such as polyvinyl alcohol (PVA), a cationic compound, or silica. The ink absorbing layer allows parallactic images to be formed at the positions corresponding to the convex lenses, thus providing an appropriate three-dimensional image.

The first embodiment further has the ink permeating layer 50 on the back of the ink absorbing layer 40. The ink permeating layer 50 is configured such that the ejected ink is first attached thereto and the attached ink passes therethrough. That is, the ink permeating layer 50 transfers the ink to the ink absorbing layer 40 suitably with no ink left therein so as to function as the base of parallactic images.

The ink permeating layer 50 is made of, for example, titanium oxide, silica gel, or polymethyl methacrylate (PMMA) to look white suitable as the base.

As shown in FIG. 1, the substrate 30 extends from the portion where it is fixed to the lenticular sheet 10a to the right in the drawing to form an extending portion 10b adjacent to the right of the right long side of the rectangular lenticular sheet 10a. The extending portion 10b has a shape that agrees with the whole back surface of the lenticular sheet 10a when folded with respect to the right long side of the lenticular sheet 10a. That is, the extending portion 10b has a rectangular shape that substantially agrees with the lenticular sheet 10a.

The front surface (the above in the drawing) of the extending portion 10b of the substrate 30 has the print paper 60 bonded thereto. The print paper 60 is used for the creator to write an addressee by hand or with a printer. Particularly for printing, paper suitable for printing, such as inkjet recording paper, is desirable.

The bonding layer 70 is formed on the back of the extending portion 10b of the substrate 30, to the back of which the release sheet 80 is bonded. The bonding layer 70 is for bonding the extending portion 10b of the substrate 30 to the back surface of the ink permeating layer 50 when the extending portion 10b is folded to the back of the lenticular sheet 10a. The bonding layer 70 may be made of an epoxy or cyanoacrylate adhesive. Any material that can bond the ink permeating layer 50 to the substrate 30 may be used.

The release sheet 80 is provided to protect the bonding layer 70 from degradation of bondability due to dirt or the like. When the extending portion 10b is folded to bond to the back surface of the extending portion 10b, the bonding layer 70 is first peeled off before the bonding. Therefore, the release sheet 80 may be made of resin, paper, or any other material as long as it can be peeled off from the bonding layer 70.

Referring to FIG. 2, the way of folding the extending portion 10b to bond to the back surface of the lenticular sheet 10a will be described. FIG. 2 is a schematic side view of the print medium 10 according to the first embodiment. Since the components of the print medium 10 such as the substrate 30 and the above-described layers are each shaped like a sheet with a thickness from about several tens to several hundred microns, FIG. 2 omits the components and shows them as one sheet for the sake of simplifying the description.

Figure 2A:
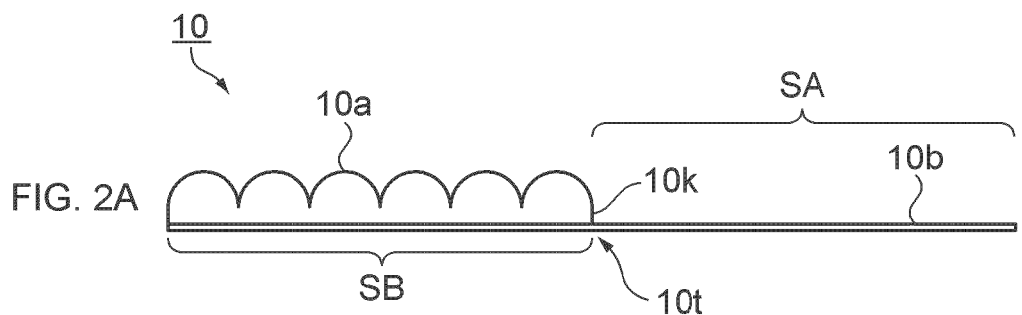
FIG. 2(a) is a schematic side view of the print medium according to the first embodiment.

As shown in FIG. 2(a), the part SB of the print medium 10 corresponding to the whole back surface (the below in the drawing) of the lenticular sheet 10a is subjected to "parallactic image printing", while the part SA corresponding to the front surface (the above in the drawing) of the extending portion 10b is subjected to "addressing". The print medium 10 has a "fold 10t" on the back, along one side 10k of the lenticular sheet 10a adjacent to the extending portion 10b. The "parallactic image printing", "addressing", and "fold 10t" will be described later as a supplementary description.

Figure 2B:
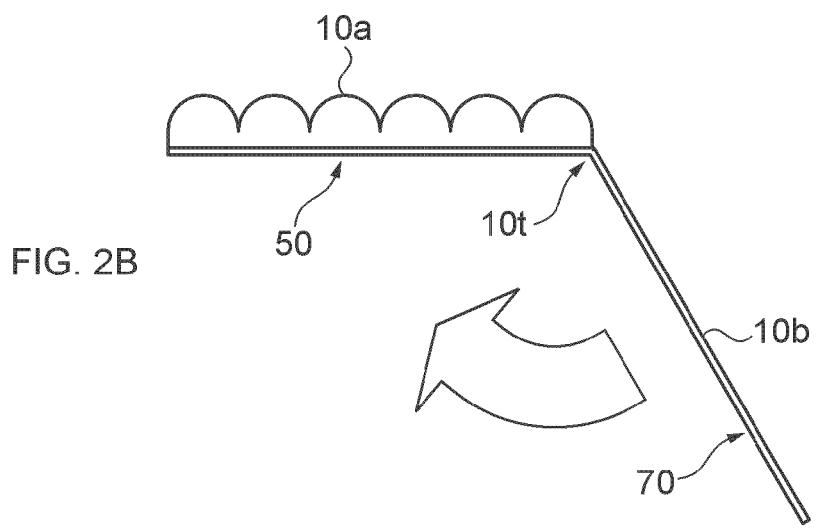
FIG. 2(b) is a schematic diagram showing a state in which an extending portion is being folded.

As shown in FIG. 2(b), the extending portion 10b is folded with respect to the fold 10t, and the release sheet 80 is peeled off from the bonding layer 70, and then the extending portion 10b is folded to the direction shown by the arrow in the drawing, so that the surface of the bonding layer 70 and the surface of the ink permeating layer 50 are bonded together.

Figure 2C:
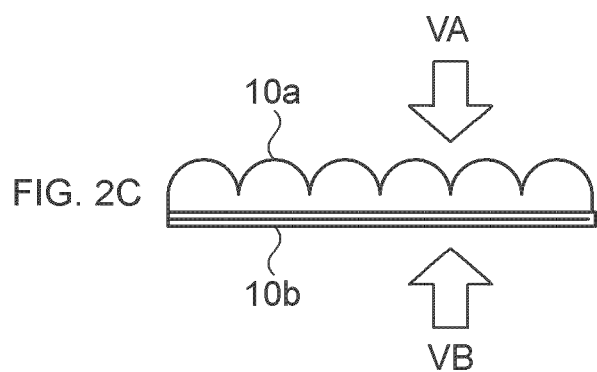
FIG. 2(c) is a schematic diagram of the print medium after the extending portion has been folded.

When the surface of the bonding layer 70 and the surface of the ink permeating layer 50 are bonded together, a three-dimensional image can be viewed from the front surface VA of the lenticular sheet 10a, and the addressee can be viewed from the back surface VB, as shown in FIG. 2(c). That is, the print medium 10 becomes a "postcard" that exhibits a three-dimensional image.

As described in FIG. 2, the lenticular sheet 10a and the extending portion 10b of the print medium 10 according to the first embodiment can easily be bonded by folding the print medium 10 along the fold 10t. Thus, the creator can easily create a postcard having a three-dimensional image without time-consuming work such as bonding an addressee form on the parallactic images with an adhesive while registering the form with the lenticular sheet.

The above-described "parallactic image printing", "addressing", and "fold" will be described as a supplementary description. In the first embodiment, the "parallactic images", "addressee", and "fold" are printed on the print medium 10 with a printer.

Figure 3A:
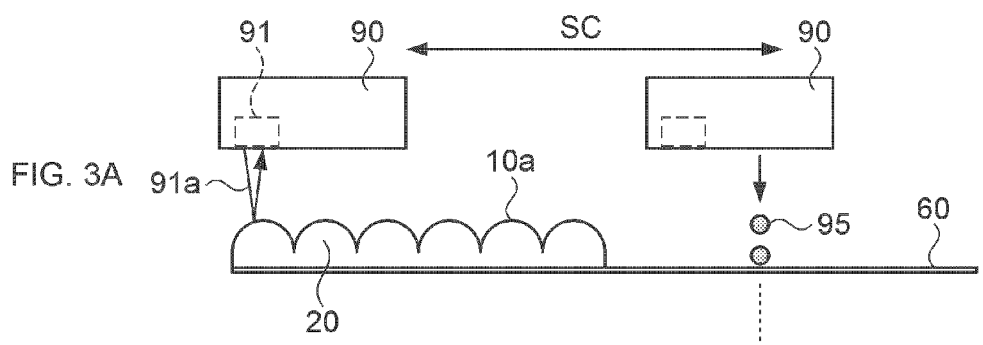
FIG. 3(a) is a schematic diagram of the print medium, showing the state of printing the front surface.
Figure 3B:
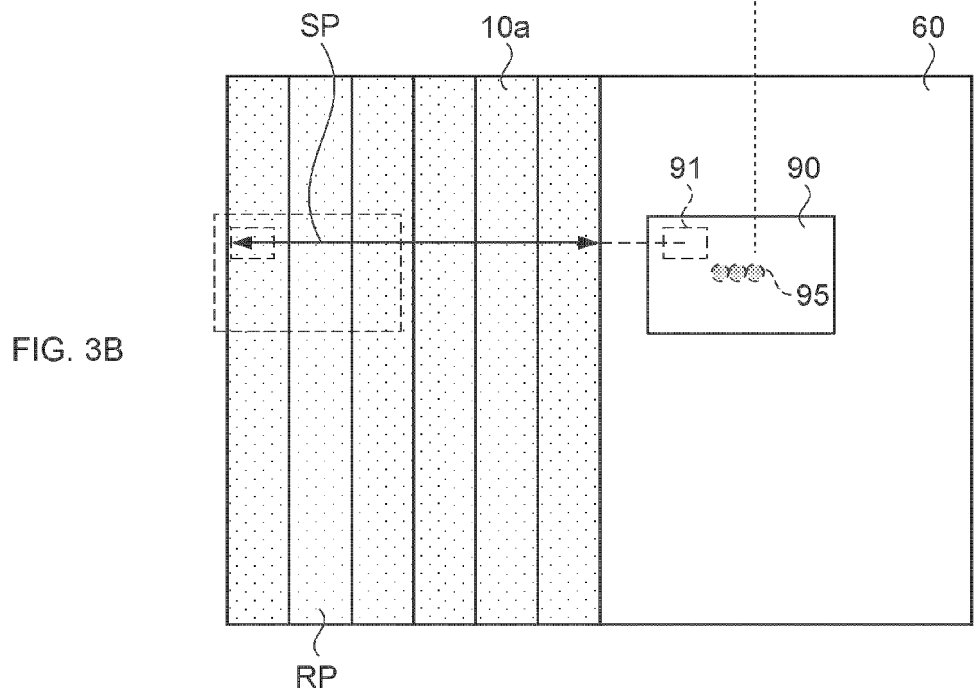
FIG. 3(b) is a schematic diagram of the print medium in FIG. 3(a) viewed from the top.

In the first embodiment, an addressee is first printed, as shown in FIG. 3. FIG. 3(a) is a schematic side view of the print medium 10, and FIG. 3(b) is a schematic top diagram of the print medium 10.

As shown in FIG. 3(a), a carriage 90 of a printer (not shown) has a sensor 91 for determining the pitch of the convex lenses 20 of the lenticular sheet 10a using reflected light 91a. The sensor 91 determines the pitch of the convex lenses with the traveling SC of the carriage 90 (indicated by the arrow in the drawing). The pitch sensing range RP is a range in which the lenticular sheet 10a is present, as indicated by the shaded area in FIG. 3(b). The range is subjected to pitch-calculation traveling SP with the traveling of the carriage 90, as indicated by the arrow in FIG. 3(b). The result of determination is processed and stored in a storage means built in the printer or the like. Thus, the pitch information of the convex lenses of the lenticular sheet can be stored.

Thereafter, when the carriage 90 enters the range of the print paper 60, ink 95 is ejected to predetermined positions from a print head (not shown) mounted to the carriage 90, thereby printing an addressee on the surface of the print paper 60.

Figure 4A:
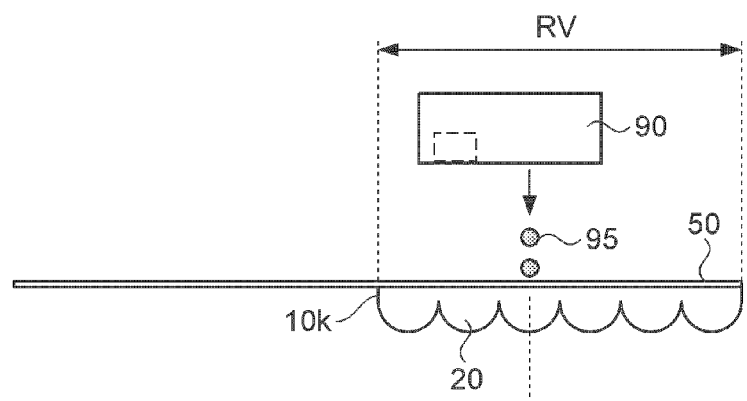
FIG. 4(a) is a schematic diagram of the print medium, showing the state of printing the back surface.
Figure 4B:
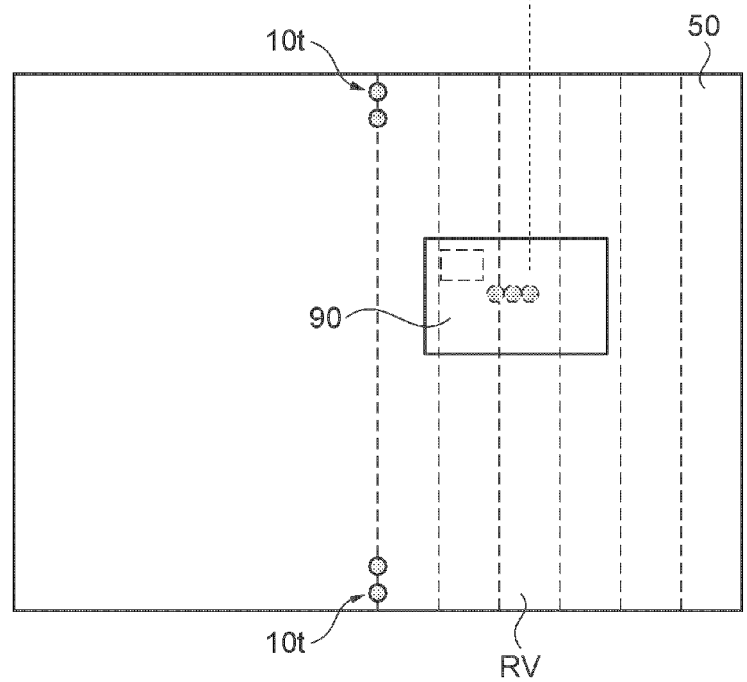
FIG. 4(b) is a schematic diagram of the print medium in FIG. 4(a) viewed from the top.

Referring to FIG. 4, the printing of parallactic images will be described. FIG. 4(a) is a schematic side view of the print medium 10, and FIG. 4(b) is a schematic top view of the print medium 10.

As shown in FIG. 4(a), the stored pitch information of the convex lenses is read for the range of the ink permeating layer 50, or a parallactic-image print range RV (the shaded area of FIG. 4(b)), and the ink 95 is ejected from the print head (not shown) of the carriage 90 to the predetermined positions corresponding to the convex lenses 20 according to the read pitch information to attach the ink onto the surface of the ink permeating layer 50, thereby printing predetermined parallactic images. Thereafter, as described in FIG. 1, the attached ink is transferred to the ink absorbing layer 40 to form the parallactic images on the back surface of the substrate 30.

The fold will then be described. In the first embodiment, as shown in FIG. 4(b), the fold 10t is printed on the left end of the parallactic-image print range RV, that is, the position corresponding to the side 10k of the lenticular sheet 10a, described in FIG. 2, by the parallactic-image printing travel of the carriage 90, thereby forming a fold. FIG. 4(b) shows the printed fold 10t by two dots each above and below, as an example. Alternatively, it may be a broken line or a solid line printed along part or all of the side 10k of the lenticular sheet 10a.

As described above, the print medium 10 according to the first embodiment allows "parallactic images" to be printed on the ink permeating layer 50, an "addressee" to be printed on the print paper 60, and a "fold" to be printed on the ink permeating layer 50, respectively. Furthermore, the pitch information of the convex lenses 20 can be obtained at the printing of the "addressee", and the "parallactic images" are printed according to the obtained pitch information, so that the parallactic images can be printed to the positions corresponding to the convex lenses. Moreover, the addressee-printed portion can easily be bonded to the back surface of the lenticular sheet 10a by bonding the print medium 10 with respect to the "fold".

Second Embodiment

Figure 8:
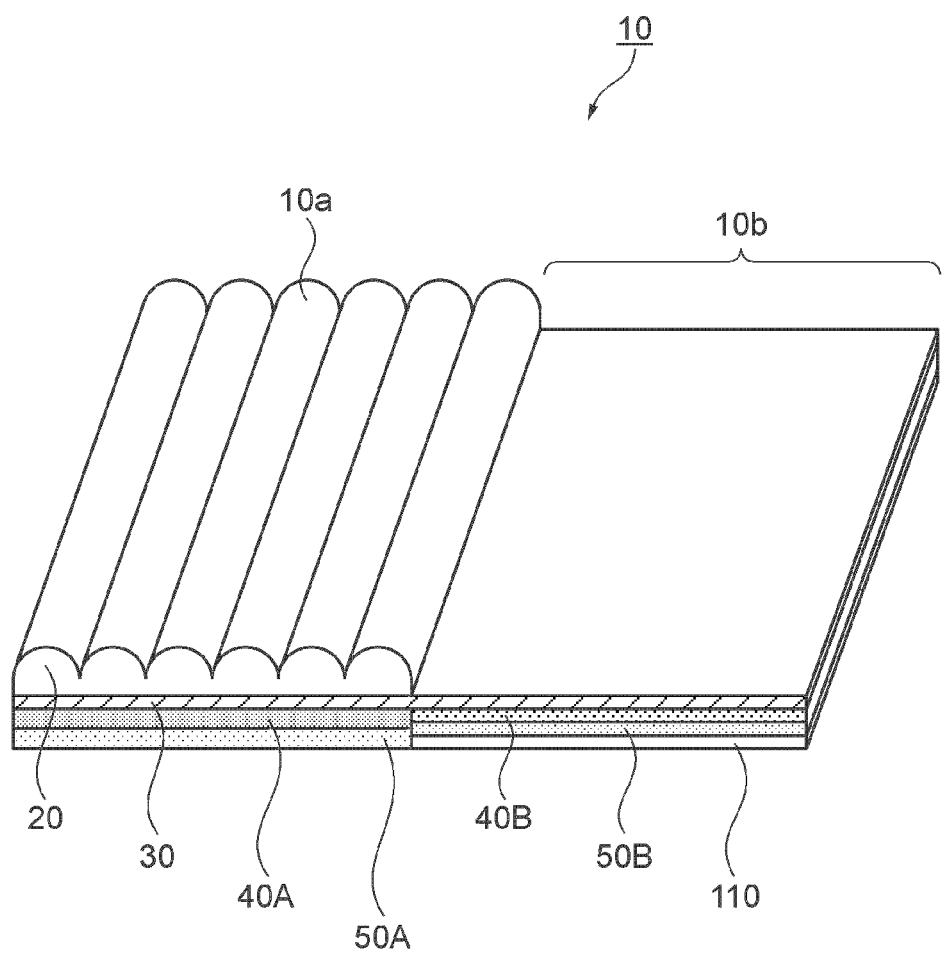
FIG. 8 is a schematic diagram of a print medium according to a second embodiment.

Referring to FIG. 8, a second embodiment of the invention will be described. FIG. 8 is a schematic diagram illustrating the components of the print medium 10. The print medium 10 includes a rectangular lenticular sheet 10a having multiple cylindrical convex lenses 20 formed on the front surface (above in the drawing), a substrate 30, a first ink absorbing layer 40A, a first ink permeating layer 50A, a second ink absorbing layer 40B, a second ink permeating layer 50B, and a bonding layer 110. Here, the first ink absorbing layer 40A and the first ink permeating layer 50A correspond to a first print surface according to the claims.

The second ink absorbing layer 40B and the second ink permeating layer 50B correspond to a second print surface of the claims.

In the second embodiment, assume that the cylinder axis of each convex lens 20 is parallel to the long side of the rectangular lenticular sheet 10a. For the sake of simplification of description, we assume that the lenticular sheet has six cylindrical convex lenses 20. A lenticular sheet having convex lenses 20 at a pitch of 30 to 180 LPI (lens per inch) is generally used as the lenticular sheet 10a, and thus the lenticular sheet 10a actually has convex lenses of this number.

The lenticular sheet 10a is formed of a transparent resin material for use in lenses, such as polyethylene terephthalate (PET), polyethylene terephthalate modified with glycol (PETG), amorphous polyethylene terephthalate (APET), polypropylene (PP), polystyrene (PS), polyvinyl chloride (PVC), acryl, ultraviolet (UV)-cured resin, polycarbonate (PC) resin, or polymethyl methacrylate (PMMA) resin, whose overall back surface (the below in the drawing) is firmly fixed to the substrate 30. The fixation is made of a known material and by a known method such as welding or bonding, depending on the material of the substrate 30; any fixation method can be adopted as long as it can fix the lenticular sheet 10a and the substrate 30 together with transparency.

The substrate 30 is made of a transparent material such as a PETG resin into a thin plate. Of course, it may be formed of a normal PET resin; any transparent material will do as long as it allows parallactic images formed on the first ink absorbing layer 40A, to be described later, to be viewed through the lenticular sheet 10a, and an "addressee" formed in the second ink absorbing layer 40B to be viewed from the lenticular sheet 10a side, and can be folded with respect to a fold, to be described later.

The substrate 30 has the first ink absorbing layer 40A on the side opposite to the lenticular sheet 10a and corresponding to the back surface of the lenticular sheet 10a. The first ink absorbing layer 40A is a component for absorbing ink, which is ejected to print parallactic images corresponding to the convex lenses, to fix the ink in the ejected positions. The first ink absorbing layer 40A is made of fine particles of hydrophilic polymer resin such as polyvinyl alcohol (PVA), a cationic compound, or silica. The ink absorbing layer allows parallactic images to be formed at the positions corresponding to the convex lenses, thus providing an appropriate three-dimensional image.

The second embodiment further has the first ink permeating layer 50A on the back of the first ink absorbing layer 40A. The first ink permeating layer 50A is configured such that the ejected ink is first attached thereto and the attached ink passes therethrough. That is, the first ink permeating layer 50A transfers the ink to the first ink absorbing layer 40A suitably with no ink left therein so as to function as the base of parallactic images.

The first ink permeating layer 50A is made of, for example, titanium oxide, silica gel, or polymethyl methacrylate (PMMA) resin to look white suitable for the base.

As shown in FIG. 8, the substrate 30 extends from the portion where it is fixed to the lenticular sheet 10a to the right in the drawing to form an extending portion 10b adjacent to the right of the right long side of the rectangular lenticular sheet 10a. The extending portion 10b has a shape that agrees with the whole back surface of the lenticular sheet 10a when folded along the "fold", to be described late, based on the right long side of the lenticular sheet 10a. That is, the extending portion 10b has a rectangular shape that substantially agrees with the lenticular sheet 10a.

The back surface (the below in the drawing) of the extending portion 10b of the substrate 30 has the second ink absorbing layer 40B. The second ink absorbing layer 40B is a component for absorbing ink ejected to form characters for addressing, such as postal numbers and addressee, and fixing the ink in the ejected positions. The second ink absorbing layer 40B is made of fine particles of hydrophilic polymer resin such as polyvinyl alcohol (PVA), a cationic compound, or silica. The second ink absorbing layer 40B allows suitable addressing.

The second embodiment further has the second ink permeating layer 50B on the back surface of the second ink absorbing layer 40B. The second ink permeating layer 50B is configured such that the ejected ink is first attached thereto and the attached ink passes therethrough. That is, the second ink permeating layer 50B transfers the ink to the second ink absorbing layer 40B suitably with no ink left therein so as to function as the base of the printed addressee.

The second ink permeating layer 50B is made of, for example, titanium oxide, silica gel, or polymethyl methacrylate (PMMA) to look white suitable for the base, as is the first ink permeating layer 50A. Since the front surface of postcards is preferably in white or light color, the second ink permeating layer 50B may be made of any another material as long as it allows ink to pass through, thereby exhibiting light color.

The bonding layer 110 is formed on the back of the second ink permeating layer 50B (the below in the drawing). The bonding layer 110 is for bonding the extending portion 10b to the back surface of the extending portion 10b by bonding the back surface of the first ink permeating layer 50A to the second ink permeating layer 50B when the extending portion 10b is folded to the back of the lenticular sheet 10a. The bonding layer 70 may be made of an epoxy or cyanoacrylate adhesive. Any material can be used as long as it can bond the first ink permeating layer 50A to the second ink permeating layer 50B.

Referring to FIG. 9, the way of folding the extending portion 10b to bond to the back surface of the lenticular sheet 10a will be described. FIG. 9 is a schematic side view of the print medium 10 according to the second embodiment. Since the components of the print medium 10 such as the substrate 30 and the first ink absorbing layer 40A are shaped like a sheet with a thickness from about several tens to several hundred microns, FIG. 9 omits the components and shows them as one sheet for the sake of simplifying the description.

Figure 9A:
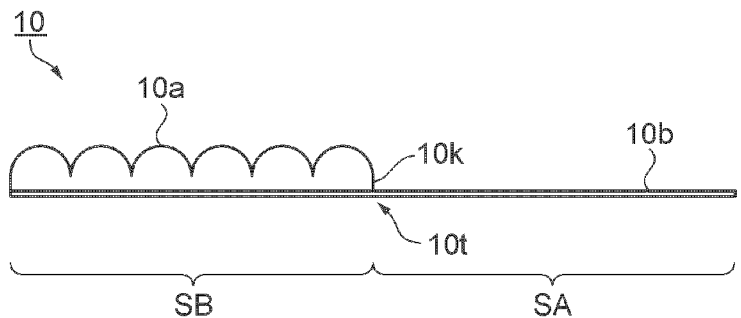
FIG. 9(a) is a schematic side view of the print medium according to the second embodiment.

As shown in FIG. 9(a), the part SB of the back surface (the below in the drawing) of the print medium 10 corresponding to the whole back surface (the below) of the lenticular sheet 10a is subjected to "parallactic image printing", while the part SA corresponding to the back surface (the below) of the extending portion 10b is subjected to "addressing". The print medium 10 has a "fold 10t" on the back and along one side 10k of the lenticular sheet 10a adjacent to the extending portion 10b. The "parallactic image printing", "addressing", and "fold 10t" will be described as a supplementary description.

Figure 9B:
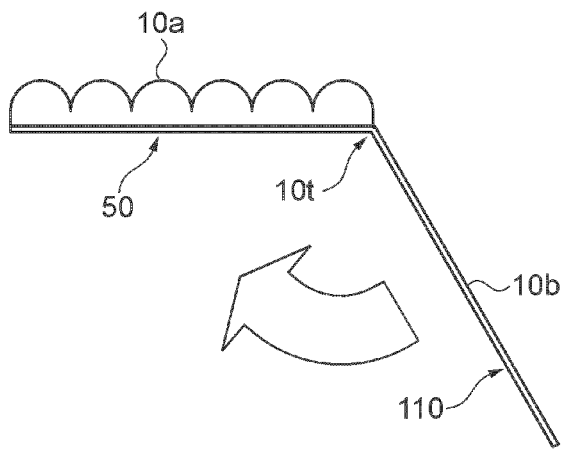
FIG. 9(b) is a schematic diagram showing a state in which an extending portion is being folded.

As shown in FIG. 9(b), the extending portion 10b is folded with respect to the fold 10t in the direction shown by the arrow in the drawing, so that the surface of the bonding layer 110 and the surface of the first ink permeating layer 50A are bonded together.

Figure 9C:
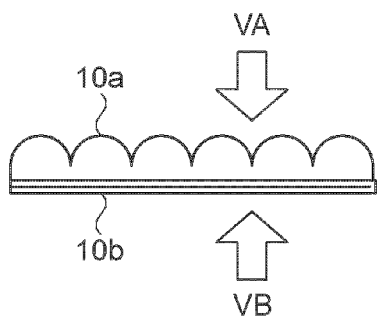
FIG. 9(c) is a schematic diagram of the print medium after the extending portion has been folded.

When the surface of the bonding layer 110 and the surface of the first ink permeating layer 50A are bonded together, a three-dimensional image can be viewed from the front surface VA of the lenticular sheet 10a, and an addressee can be viewed from the back surface VB of the extending portion 10b, as shown in FIG. 9(c). That is, the print medium 10 becomes a "postcard" that exhibits a three-dimensional image.

As described in FIG. 9, the lenticular sheet 10a and the extending portion 10b of the print medium 10 according to the second embodiment can easily be bonded by folding the print medium 10 along the fold 10t. Thus, the creator can easily create a postcard having a three-dimensional image without time-consuming work such as bonding an addressee form on the parallactic images with an adhesive while registering the form with the lenticular sheet.

The above-described "parallactic image printing", "addressing", and "fold" will be described as a supplementary description. In the second embodiment, the "parallactic image", "addressee", and "fold" are printed on the print medium 10 with a printer.

Prior to description of the printing, the planar structure of the second ink absorbing layer 40B, the second ink permeating layer 50B, and the bonding layer 110 formed on the back of the extending portion 10b according to the second embodiment will be described.

Figure 10:
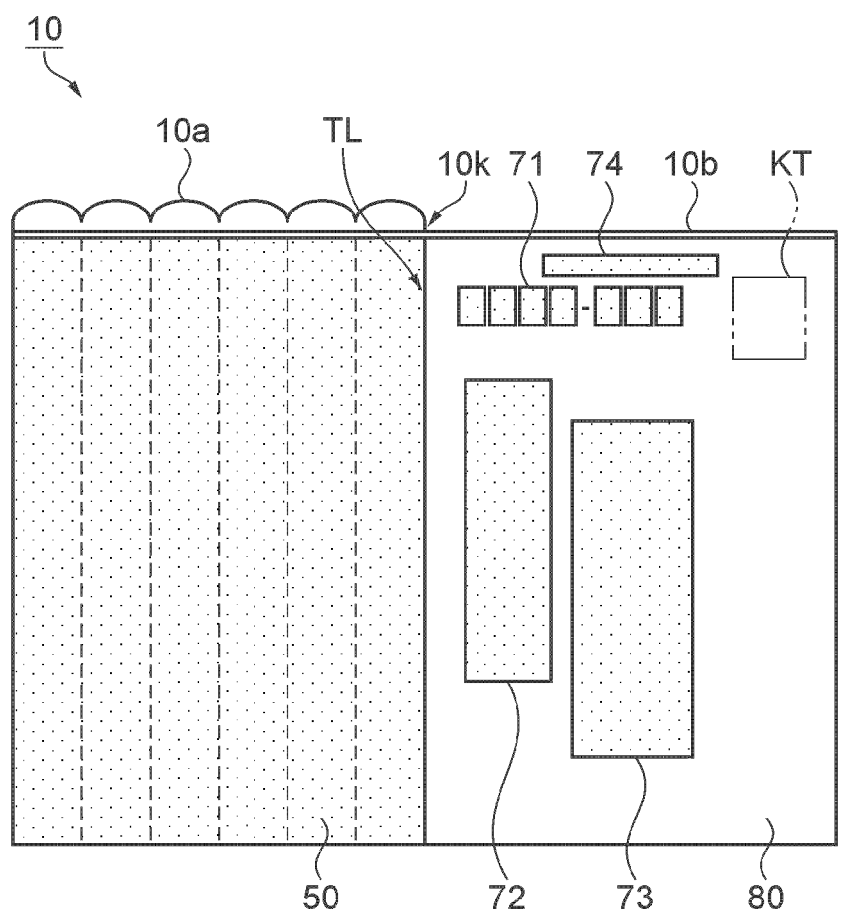
FIG. 10 is a schematic diagram of the print medium of the second embodiment viewed from the back.

FIG. 10 is a schematic diagram of the print medium 10 of the second embodiment viewed from the back. The ink permeating layer 50 is formed all over the back surface of the lenticular sheet 10a, as shown by the shaded portion. The bonding layer 110 is disposed on the back of the extending portion 10b. The first ink permeating layer 50A and the bonding layer 110 are disposed so as to be next to each other at a line TL corresponding to the side 10k of the lenticular sheet 10a.

The bonding layer 110 is formed in an area other than predetermined areas. In the second embodiment, as shown in FIG. 10, the predetermined areas include a zip-code frame area 71, an address area 72, a name area 73, and a postal-card indication area 74 for indicating "Postal Card" or its equivalent. The bonding layer 110 is formed in the area other than them. Therefore, the predetermined areas have no bonding layer 110 but have the second ink permeating layer 50B exposed to the front surface.

In the second embodiment, the address area 72 and the name area 73 are arranged in preferred positions in plan view in consideration of the position for a postage stamp KT with vertical writing as a precondition. Of course, the predetermined areas such as the address area 72 and the name area 73 may be arranged in preferred positions in plan view with lateral writing as a precondition. In addition, other areas suitable for postcards may be formed in any positions on the back surface of the extending portion 10b.

Figure 11A:
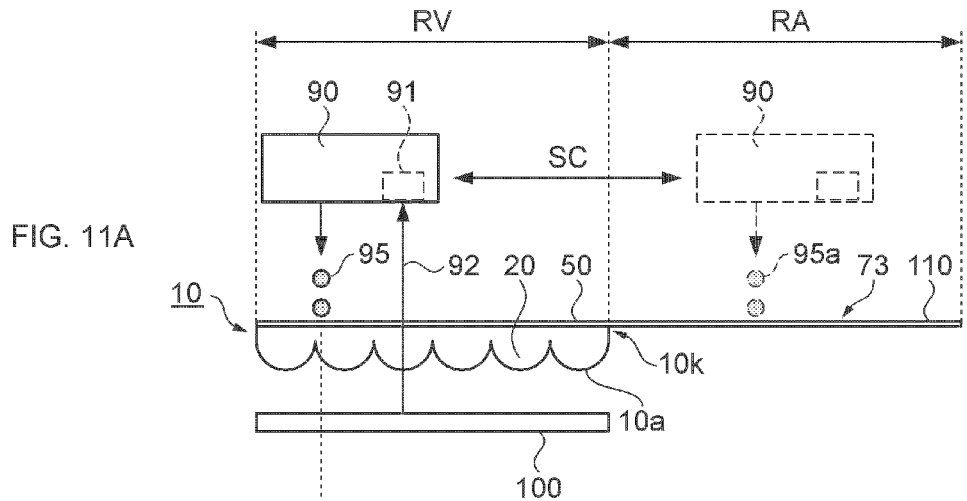
FIG. 11(a) is a schematic diagram of the print medium of the second embodiment, showing the state of printing.
Figure 11B:
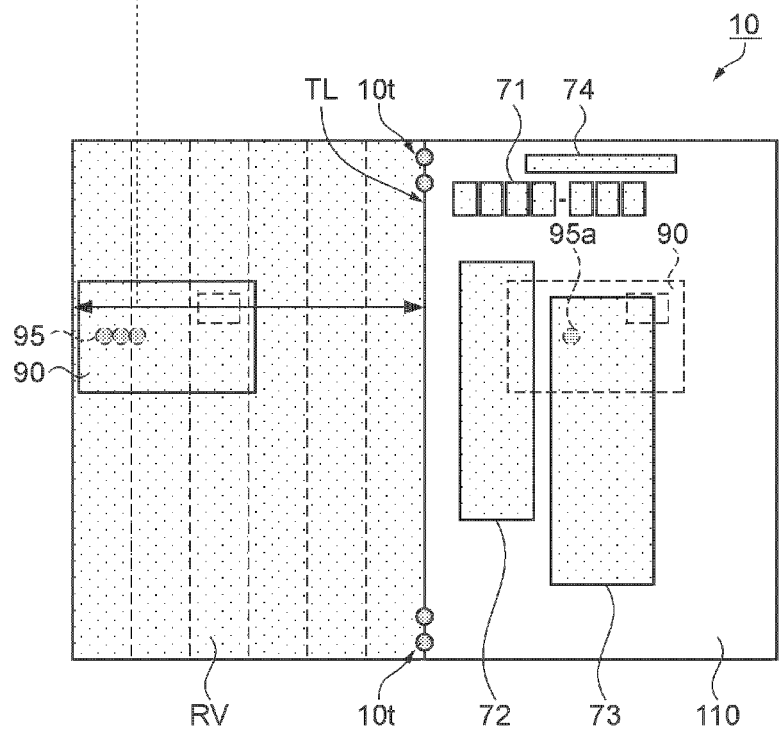
FIG. 11(b) is a schematic diagram of the print medium in FIG. 11(a) viewed from the top.

Referring to FIG. 11, the way of printing the "parallactic image", "addressee", and "fold" on the print medium 10 according to the second embodiment will be described. FIG. 11(a) is a schematic side view of the print medium 10, and FIG. 11(b) is a schematic top view of the print medium 10.

As shown in FIG. 11(a), there is a carriage 90 having a printer head (not shown) above the print medium 10. The carriage 90 reciprocates along the arrow SC, thereby executing printing on the print medium. The print medium 10 is transferred by a transfer means (not shown) of the printer, such as a roller, from this side to the rear in the drawing, and thus the whole area of the print medium 10 is printed.

The part of the print medium 10 under the lenticular sheet 10a has a light-emitting surface 100. The sensor 91 of the carriage 90 senses light 92 that is emitted from the light-emitting surface 100 and passed through the convex lenses 20, the substrate 30, the first ink absorbing layer 40A, and the first ink permeating layer 50A. The amount of the transmitted light 92 changes with changes in the thickness of the convex lenses 20. Thus, the sensor 91 senses changes in the amount of the transmitted light with the travel of the carriage 90 (indicated by the arrow in the drawing), thereby determining the pitch of the convex lenses 20 of the lenticular sheet 10a.

The range of determination is the whole range of the lenticular sheet 10a, as indicated by the shaded area in FIG. 11(b). This range is subjected to pitch-calculation traveling SP with the travel of the carriage 90, as indicated by the arrow in FIG. 11(b). The result of calculation is processed and stored in a storage means built in the printer or the like. Thus, the pitch information of the convex lenses of the lenticular sheet can be stored.

When the carriage 90 travels the parallactic-image print range RV, the stored pitch information of the convex lenses is read, and ink 95 is ejected to predetermined positions corresponding to the convex lenses 20 from the print head (not shown) mounted to the carriage 90 according to the read pitch information to attach the ink onto the front surface of the first ink permeating layer 50A, thereby printing predetermined parallactic images. Thereafter, as described in FIG. 8, the attached ink is transferred to the first ink absorbing layer 40A to form the parallactic images on the overall back surface of the lenticular sheet 10a through the substrate 30.

Then, when the traveling position of the carriage 90 moves from the parallactic-image print range RV to the addressee print range RA, as shown in FIG. 11(a), an "addressee" including zip code, name, and other characters is printed on the zip-code frame area 71, the address area 72, the name area 73, and the indication area 74. Specifically, ink 95a is ejected from the print head (not shown) of the carriage 90 onto the front surface of the second ink permeating layer 50B. Then, the attached ink is transferred to the second ink absorbing layer 40B to print the "addressee" on the back of the substrate 30, as described with reference to FIG. 8. The positions of the carriage 90 indicated by the broken lines in FIGS. 11(a) and 11(b) show the positions where a name is printed on the name area 73.

Since general parallactic images are colored images, color inks are used for the ink 95. In order to print parallactic images for the right eye and the left eye in one small pitch of the convex lenses, ink droplets of small sizes are desirable. In contrast, for addressing, black ink is generally used as the ink 95a because characters such as zip code and a name are to be printed, and ink droplets of large sizes are preferable because bold characters are often used for visibility.

In the second embodiment, the ink 95 and the ink 95a can be ejected preferably for parallactic images and addressee, respectively, from the print head of the carriage 90. The ink 95 is used for the parallactic-image print range RV, while the ink 95a is used for the addressee print range RA, with the line TL at which the first ink permeating layer 50A and the bonding layer 110 are adjacent to each other. Thus, both parallactic images and an addressee can be printed at the same time.

Since addressee are generally composed of characters larger than parallactic images, the traveling speed of the carriage 90 may be set higher for the addressee print range RA than for the parallactic-image print range RV with the line TL as the border. This can reduce the time involved in printing an addressee. The ink 95a may be colored ink. The size of the droplets and the traveling speed of the carriage may be the same between them.

In the second embodiment, an addressee is printed in a mirror image in which the right and left are reversed as viewed from the front in FIG. 10 (or FIG. 11(b)). Specifically, as described with reference to FIG. 9, when the extending portion 10b is folded onto the first ink permeating layer 50A so as to use the print medium 10 as a postcard, the printed addressee is reversed left to right. Therefore, the addressee is printed reversely in advance so as to be read correctly.

Next, the fold will be described. In the second embodiment, as shown in FIG. 11(b), the fold 10t is printed on the right end of the parallactic-image print range RV, that is, on the position corresponding to the side 10k of the lenticular sheet 10a, described in FIG. 9, during the parallactic-image print traveling, thereby forming a fold. Thus, the fold 10t is printed by ejecting ink from the print head of the carriage 90 at the line TL to attach the ink onto the front surface of the first ink permeating layer 50A.

At that time, the ink, or the fold 10t, which is attached to the first ink permeating layer 50A, permeates and is fixed in the first ink absorbing layer 40A, in a manner similar to the ink that has printed the parallactic images, as described in FIG. 8. Thus, the creator knows the position of the printed fold 10t through the first ink permeating layer 50A. Therefore, high-visibility ink such as black ink is suitable for printing the fold 10t.

FIG. 11(b) shows the printed fold 10t by two dots each above and below, as an example. Alternatively, it may be a broken line or a solid line printed along part or all of the side 10k of the lenticular sheet 10a. This can improve the visibility of the fold.

As described above, the print medium 10 according to the second embodiment allows "parallactic images" to be printed on the first ink permeating layer 50A, and an "addressee" to be printed on the second ink permeating layer 50B, respectively, both of which are disposed on the side of the substrate 30 opposite to the lenticular sheet 10a. Thus, both the parallactic images and the addressee can be printed at the same time by one-side printing without reversing the print medium.

Moreover, at the printing of parallactic images, the pitch information of the convex lenses 20 is determined and the parallactic images is printed on the first ink permeating layer 50A on the basis of the determined pitch information. Thus, the parallactic images can be printed in the positions corresponding to the convex lenses.

Since the print medium is folded with respect to the fold 10t, the extending portion 10b on which an addressee is written can easily be bonded to the back surface of the lenticular sheet 10a with the bonding layer 110. Thus, the creator can send the print medium as a postcard without time-consuming work such as bonding the extending portion 10b to the back surface of the lenticular sheet 10a with another adhesive.

Third Embodiment

Figure 12:
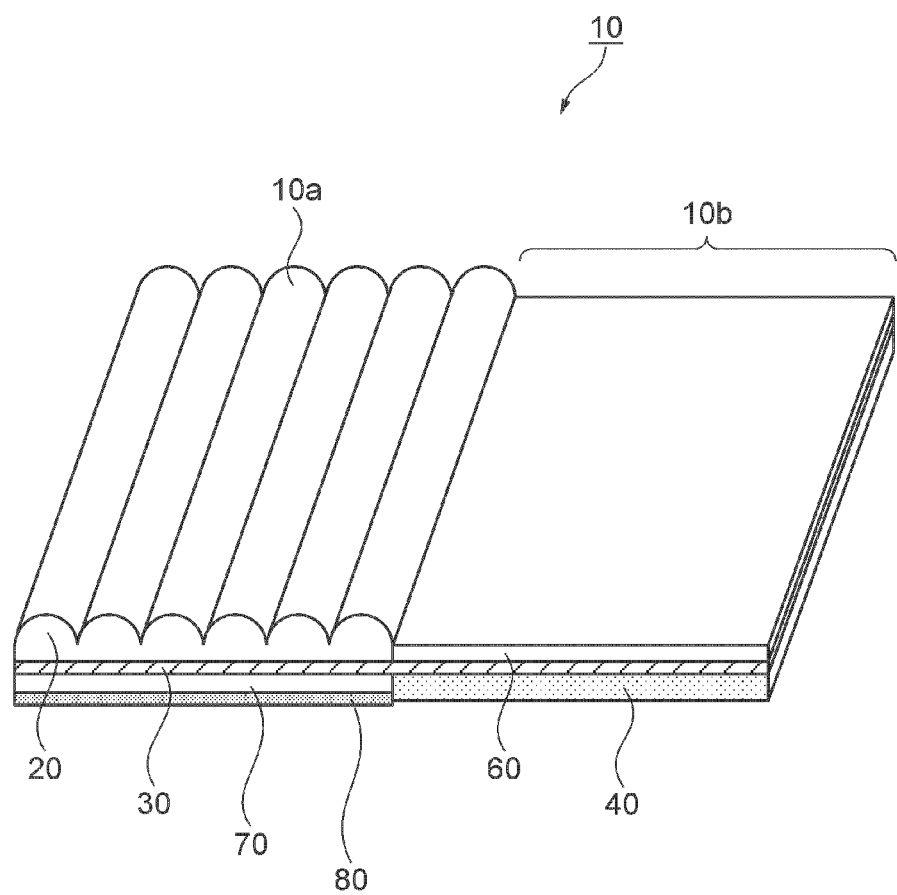
FIG. 12 is a schematic diagram of a print medium according to a third embodiment.

A third embodiment of the invention will be described with reference to FIG. 12. FIG. 12 is a schematic diagram illustrating the components of the print medium 10. The print medium 10 includes a rectangular lenticular sheet 10a having multiple cylindrical convex lenses 20 formed on the front surface (above in the drawing), a substrate 30, an ink absorbing layer 40, a sheet of print paper 60, a bonding layer 70, and a release sheet 80. The ink absorbing layer 40 corresponds to a first print surface of the claims. The print paper 60 corresponds to a second print surface of the claims.

In the third embodiment, assume that the cylinder axis of each convex lens 20 is parallel to the long side of the rectangular lenticular sheet 10a. For the sake of simplification of description, we assume that the lenticular sheet has six cylindrical convex lenses 20. A lenticular sheet having convex lenses 20 at a pitch of 30 to 180 LPI (lens per inch) is generally used as the lenticular sheet 10a, and thus the lenticular sheet 10a actually has convex lenses of this number.

The lenticular sheet 10a is formed of a transparent resin material for use in lenses, such as polyethylene terephthalate (PET), polyethylene terephthalate modified with glycol (PETG), amorphous polyethylene terephthalate (APET), polypropylene (PP), polystyrene (PS), polyvinyl chloride (PVC), acryl, ultraviolet (UV)-cured resin, polycarbonate (PC) resin, or polymethyl methacrylate (PMMA) resin, whose overall back surface (the below in the drawing) is firmly fixed to the substrate 30. The fixation is made of a known material and by a known method such as welding or bonding, depending on the material of the substrate 30; any fixation method can be adopted as long as it can fix the lenticular sheet 10a and the substrate 30 together with transparency.

The substrate 30 is made of a transparent material such as a PETG resin into a thin plate. Of course, it may be made of a normal PET resin; any transparent material will do as long as it allows parallactic images formed on the ink absorbing layer 40, to be described later, to be viewed from the lenticular sheet 10a side and can be folded at a fold, to be described later.

As shown in FIG. 12, the substrate 30 extends from the portion where it is fixed to the lenticular sheet 10a to the right in the drawing to form an extending portion 10b adjacent to the right of the right long side of the rectangular lenticular sheet 10a. The extending portion 10b has a shape that agrees with the whole back surface of the lenticular sheet 10a when folded along a "fold", to described later, with respect to the right long side of the lenticular sheet 10a. That is, the extending portion 10b has a rectangular shape that substantially agrees with the lenticular sheet 10a.

The back surface (the below in the drawing) of the extending portion 10b of the substrate 30 has the ink absorbing layer 40. The ink absorbing layer 40 is a component in which parallactic images for the convex lenses are formed. When the parallactic images are printed by the ejection of ink, the ink absorbing layer 40 absorbs the ejected ink and fixes the ink to the ejected positions. The ink absorbing layer allows stable formation of parallactic images on the positions corresponding to the convex lenses, thus forming a three-dimensional image appropriately. The ink absorbing layer 40 is made of fine particles of hydrophilic polymer resin such as polyvinyl alcohol (PVA), a cationic compound, or silica.

The front surface (the above in the drawing) of the extending portion 10b has the print paper 60 bonded thereto. The print paper 60 is used for the creator to write an addressee including an address by hand or with a printer. Particularly for printing, paper suitable for printing, such as inkjet recording paper is desirable.

As noted above, the ink absorbing layer 40 on which parallactic images are printed is disposed on the back of the print paper 60 with the transparent substrate 30 in between. Therefore, it is preferable that the print paper 60 be opaque so that the parallactic images cannot easily be viewed from the front surface, and the addressee written to the print paper 60 cannot easily be viewed from the back surface (the below in the drawing).

On the other hand, the substrate 30 has the bonding layer 70 on the side opposite to the lenticular sheet 10a and corresponding to the back surface of the lenticular sheet 10a, and has the release sheet 80 on the back (the below in the drawing) of the bonding layer 70.

The bonding layer 70 is for bonding the ink absorbing layer 40 of the extending portion 10b to the back surface of the substrate 30 corresponding to the back surface of the lenticular sheet 10a when the extending portion 10b is folded to the back of the lenticular sheet 10a. This allows the parallactic images printed on the ink absorbing layer 40 to be viewed from the surface of the lenticular sheet 10a through the bonding layer 70 and the substrate 30.

To that end, the bonding layer 70 is made of a transparent material such as an epoxy or cyanoacrylate adhesive. Any transparent material that can bond the ink absorbing layer 40 to the substrate 30 may be used.

The release sheet 80 is provided to protect the bonding layer 70 from degradation of bondability due to dirt or the like. When the extending portion 10b is folded to bond to the back surface of the extending portion 10b, the bonding layer 70 is first peeled off before the bonding. Therefore, the release sheet 80 may be made of any material including resin or paper as long as it can be peeled off from the bonding layer 70.

Referring to FIG. 13, the way of folding the extending portion 10b to bond to the back surface of the lenticular sheet 10a will be described. FIG. 13 is a schematic side view of the print medium 10 according to the third embodiment. Since the components of the print medium 10 such as the substrate 30 and the above-described ink absorbing layer 40 are shaped like a sheet (thin plate) with a thickness from about several tens to several hundred microns, FIG. 13 omits the components and shows them as one sheet for the sake of simplifying the description.

Figure 13A:
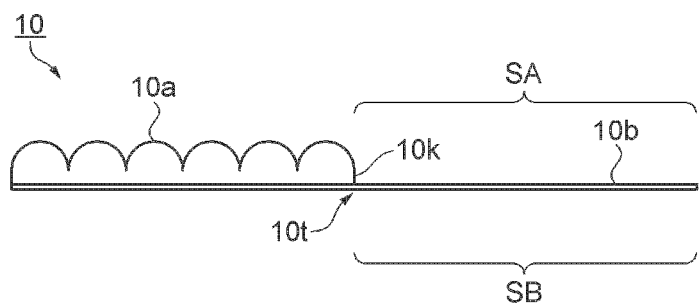
FIG. 13(a) is a schematic side view of the print medium according to the third embodiment.

As shown in FIG. 13(a), the part SB of the back surface (the below in the drawing) of the print medium 10 corresponding to the whole back surface (the below) of the extending portion 10b is subjected to "parallactic image printing", while the part SA corresponding to the front surface (the above in the drawing) of the extending portion 10b is subjected to "addressing". The print medium 10 has a "fold 10t" on the back and along one side 10k of the lenticular sheet 10a adjacent to the extending portion 10b. The "parallactic image printing", "addressing", and "fold 10t" will be described as a supplementary description.

Figure 13B:
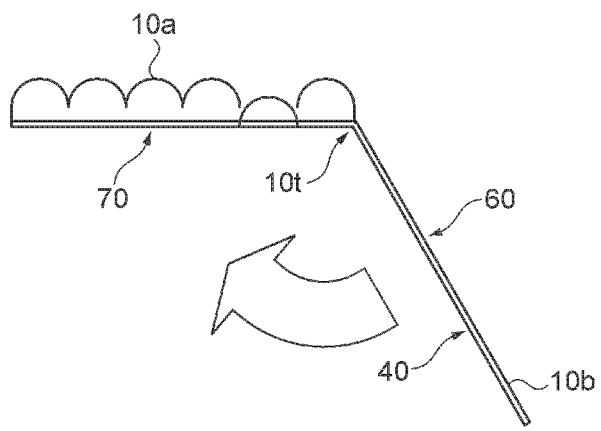
FIG. 13(b) is a schematic diagram showing a state in which an extending portion is being folded.

As shown in FIG. 13(b), the extending portion 10b is folded with respect to the fold 10t in the direction shown by the arrow in the drawing, so that the surface of the bonding layer 70 and the surface of the ink absorbing layer 40 are bonded together.

Figure 13C:
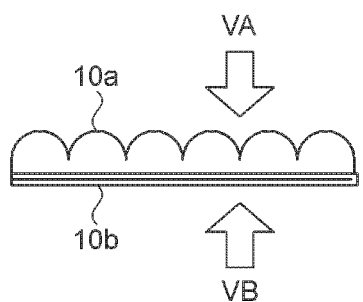
FIG. 13(c) is a schematic diagram of the print medium after the extending portion has been folded.

When the surface of the bonding layer 70 and the surface of the ink absorbing layer 40 are bonded together, a three-dimensional image can be viewed from direction VA of the front surface of the lenticular sheet 10a, and the addressee can be viewed from direction VB below the extending portion 10b, as shown in FIG. 13(c). That is, the print medium 10 becomes a "postcard" that exhibits a three-dimensional image.

As described in FIG. 13, the lenticular sheet 10a and the extending portion 10b of the print medium 10 of the third embodiment can easily be bonded by folding along the fold 10t. Thus, the creator can easily create a postcard having a three-dimensional image without time-consuming work such as bonding an addressee form on the parallactic images with an adhesive while registering the form with the lenticular sheet.

The above-described "parallactic image printing", "addressing", and "fold 10t" will be described as a supplementary description. In the third embodiment, the "parallactic image", "addressee", and "fold 10t" are printed on the print medium 10 with a printer.

Figure 14A:
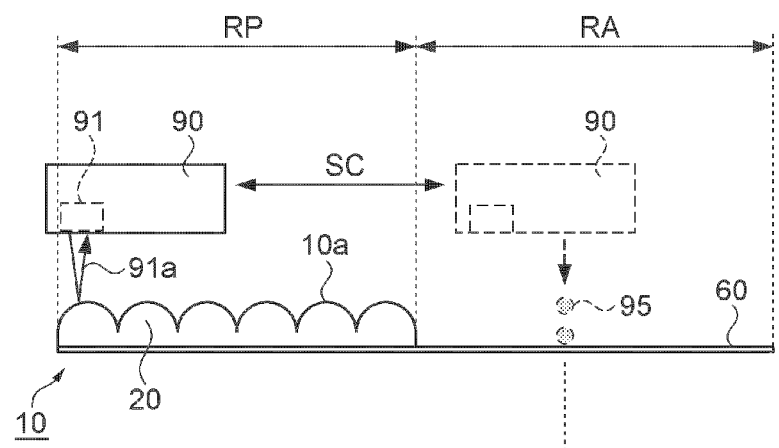
FIG. 14(a) is a schematic diagram of the print medium of the third embodiment.
Figure 14B:
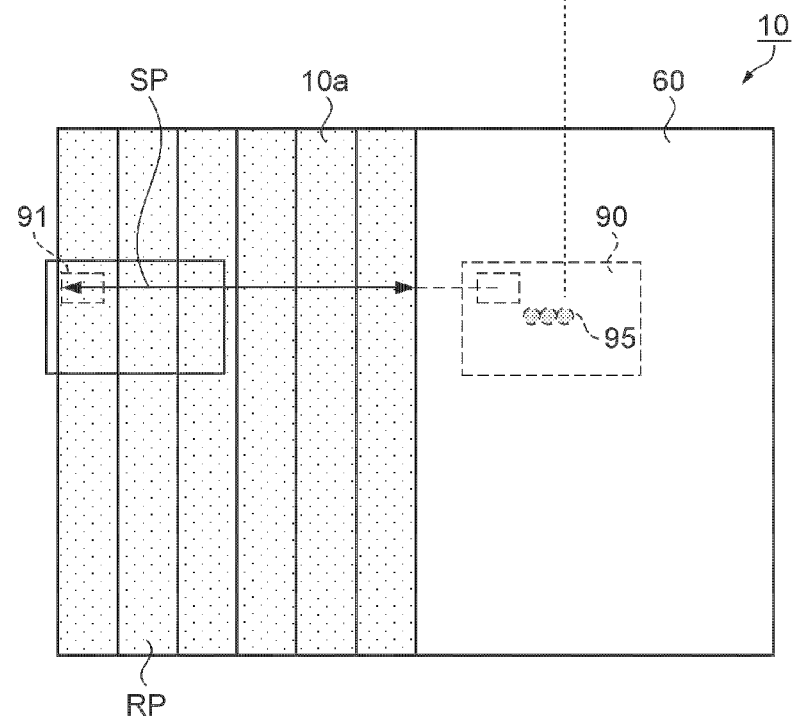
FIG. 14(b) is a schematic diagram of the print medium viewed from the top.

In the third embodiment, an "addressee" is first printed, which is shown in FIG. 14. FIG. 14(a) is a schematic side view of the print medium 10, and FIG. 14(b) is a schematic top view of the print medium 10. As shown in FIG. 14(a), there is a carriage 90 having a printer head (not shown) above the print medium 10. The carriage 90 reciprocates along the arrow, thereby executing printing on the print medium. Referring to FIG. 14(b), the print medium 10 is transferred by a print-medium transfer means of the printer, such as a paper feed roller (not shown), vertically in the drawing, so that the whole area of the print medium 10 is printed.

As shown in FIG. 14(a), the carriage 90 has a sensor 91 for determining the pitch of the convex lenses 20 of the lenticular sheet 10a using reflected light 91a. The sensor 91 determines the pitch of the convex lenses 20 with the traveling SC of the carriage 90 (indicated by the arrow in the drawing). The pitch sensing range RP is a range in which the lenticular sheet 10a is present, as indicated by the shaded area in FIG. 14(b). The range is subjected to pitch-calculation traveling with the traveling of the carriage 90, as indicated by the arrow in FIG. 14(b). The result of determination is processed and stored in a storage means built in the printer or the like. Thus, the pitch information of the convex lenses of the lenticular sheet is stored.

Thereafter, when the carriage 90 enters the addressee print range RA of the print paper 60, ink 95 is ejected to predetermined positions from the print head mounted to the carriage 90, thereby printing an addressee on the surface of the print paper 60.

Figure 15A:
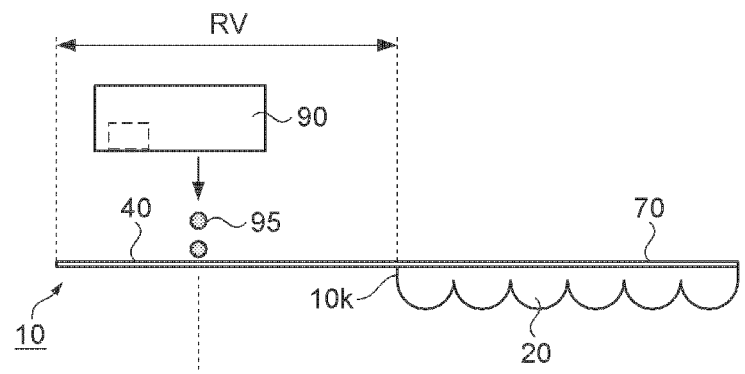
FIG. 15(a) is a schematic diagram of the print medium of the third embodiment, showing the state of printing.
Figure 15B:
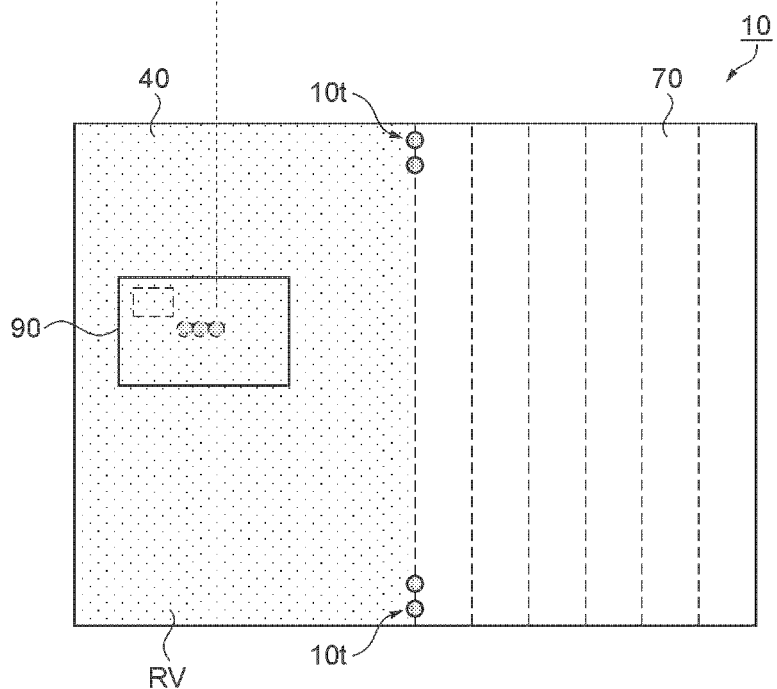
FIG. 15(b) is a schematic diagram of the print medium in FIG. 15(a) viewed from the top.

Referring to FIG. 15, the printing of parallactic images will be described. FIG. 15(a) is a schematic side view of the print medium 10, and FIG. 15(b) is a schematic top view of the print medium 10.

As shown in FIG. 15(a), the stored pitch information of the convex lenses is read for the range of the ink permeating layer 50, or the parallactic-image print range RV (the shaded area of FIG. 15(b)), and the ink 95 is ejected from the print head of the carriage 90 to the predetermined positions corresponding to the convex lenses to attach the ink onto the surface of the ink absorbing layer 40, thereby printing predetermined parallactic images. Thereafter, as described in FIG. 12, the attached ink is fixed to the ink absorbing layer 40 to form stable parallactic images on the back surface of the substrate 30.

The parallactic images formed on the basis of the pitch information of the convex lenses are folded to the surface of the bonding layer 70 and bonded thereto, as described above. Therefore, the position of the convex lenses and that of the parallactic images corresponding thereto are reversed left to right. Therefore, as shown in FIG. 15(b), when the parallactic images are printed, with the print medium 10 turned inside out so that the right and left are reversed from the state shown in FIG. 14(b), the stored pitch information of the convex lenses can be read for use without an additional operation such as a horizontal reversing operation.

Next, the "fold" will be described. In the third embodiment, as shown in FIG. 15(b), the fold 10t is printed on the right end of the parallactic-image print range RV, that is, on the position corresponding to the side 10k of the lenticular sheet 10a, described in FIG. 13, during the parallactic-image print traveling of the carriage 90, thereby forming a fold.

For example, referring to FIG. 15(b), when the parallactic images at the right end of the parallactic-image print range RV is printed with the ink 95 ejected to the rightmost end of the images, black ink is used. Not only the black ink, but also color ink having higher visibility to parallactic images may be used.

FIG. 15(b) shows the printed fold 10t by two dots each above and below, as an example. Alternatively, it may be a broken line or a solid line printed along part or all of the side 10k of the lenticular sheet 10a. This can improve the visibility of the fold.

As described above, the print medium 10 according to the third embodiment allows "parallactic images" to be printed on the ink absorbing layer 40 of the print medium 10, an "addressee" to be printed on the print paper 60, and the "fold" to be printed on the ink absorbing layer 40, respectively. The pitch information of the convex lenses 20 can be determined at the printing of the "addressee". Thus parallactic images can be printed at the positions corresponding to the convex lenses according to the determined pitch information.

Since the print medium 10 is folded with respect to the fold 10t, the extending portion 10b on which parallactic images and an addressee are printed can easily be bonded to the back surface of the lenticular sheet 10a with the bonding layer 70. Thus, the creator can easily bond the parallactic images to proper positions of the lenticular sheet by folding the print medium 10 with respect to the fold. Thus, the creator can bond them with accurate registration while reducing the displacement between the convex lenses and the parallactic images. Thus, the creator can send the print medium as a postcard to without time-consuming work such as bonding the extending portion 10b to the back surface of the lenticular sheet 10a with another adhesive.

While the invention has been described with reference to the first, second, and third embodiments of the invention, it is to be understood that the invention is not limited to those embodiments and various modifications may be made without departing from the scope and spirit of the invention.

(First Modification)

As shown in FIG. 1, the first embodiment is constructed such that the cylinder axis of each convex lens 20 formed on the front surface of the lenticular sheet 10a is parallel to the long side of the rectangular lenticular sheet 10a. In this modification, the axis may not be parallel to the long side of the lenticular sheet 10a.

Figure 5A:
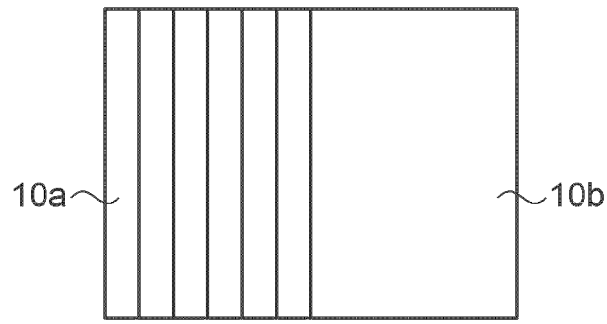
FIG. 5(a) is a schematic diagram of the print medium according to the first embodiment.

The first modification will be described with reference to FIG. 5. FIG. 5(a) is a schematic diagram of the print medium 10 according to the first embodiment, which is shown for comparison with print mediums of this modification shown in FIGS. 5(b) to 5(d). As shown in FIG. 5(a), the lenticular sheet 10a of the first embodiment has a lenticular lens including convex lenses each having a vertical cylinder axis, on the right side of which the extending portion 10b is present.

Figure 5B:
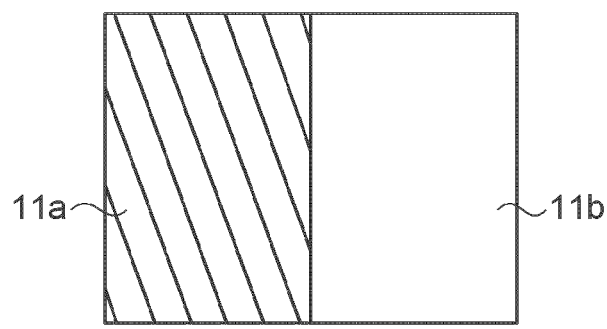
FIGS. 5(b) to 5(d) are schematic diagrams of examples of the print medium of a first modification.

In contrast, the print medium shown in FIG. 5(b) comprises a lenticular sheet 11a whose convex lenses each have a cylinder axis that is slightly turned to the left and an extending portion 11b. The print medium shown in FIG. 5(c) comprises a lenticular sheet 12a whose convex lenses each have a cylinder axis that is further turned to the left and an extending portion 12b. The print medium shown in FIG. 5(d) comprises a lenticular sheet 13a whose convex lenses each having a horizontal cylinder axis that is further turned to the left and an extending portion 13b.

These oblique cylinder axes of the convex lenses provide the lenticular sheet with both the function of a longitudinal lenticular sheet and the function of a horizontal lenticular sheet. For example, the function of a longitudinal lenticular sheet can provide a three-dimension image because it allows a parallactic image for the left eye and a parallactic image for the right eye to be viewed by the respective eyes, as described above. On the other hand, the function of a horizontal lenticular sheet can provide different parallactic images, or changing images, when the viewer changes the angle of the lenticular sheet by changing the angle of the lenticular sheet for the vertical direction, although it cannot provide a three-dimensional image because the left eye and the right eye view the same parallactic image. Therefore, forming parallactic images having those functions on the print media of this modification facilitates creating postcards with various parallactic images.

While the cylinder axes of the convex lenses in the first modification are turned to the left, they may be turned to the right. The angle of the turn is also not limited to those illustrated.

Figure 5C:
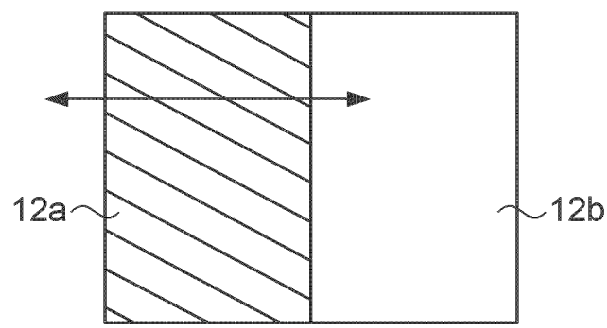
Figure 5D:
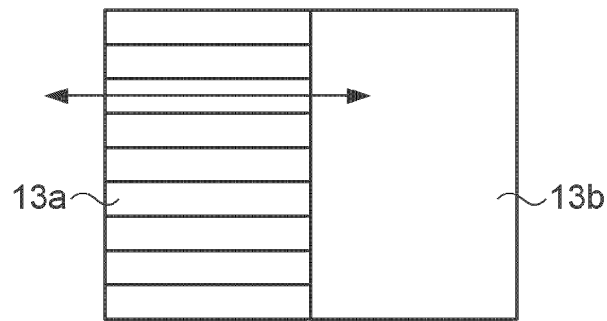

In the case of the print media shown in FIGS. 5(c) and 5(d) according to the first modification, the number of the convex lenses 20 determined during the traveling of the carriage along the arrow as described in FIG. 3, is sometimes smaller than actual ones or becomes zero. Thus, the accuracy of the pitch information will be reduced or no pitch information will be obtained, thereby disabling printing of parallactic images in proper positions.

Further another modification of the first modification is therefore provided in which the extending portion is provided not adjacent to the long side of the rectangular lenticular sheet but to the short side. This modification will be described by reference to FIG. 6.

Figure 6A:
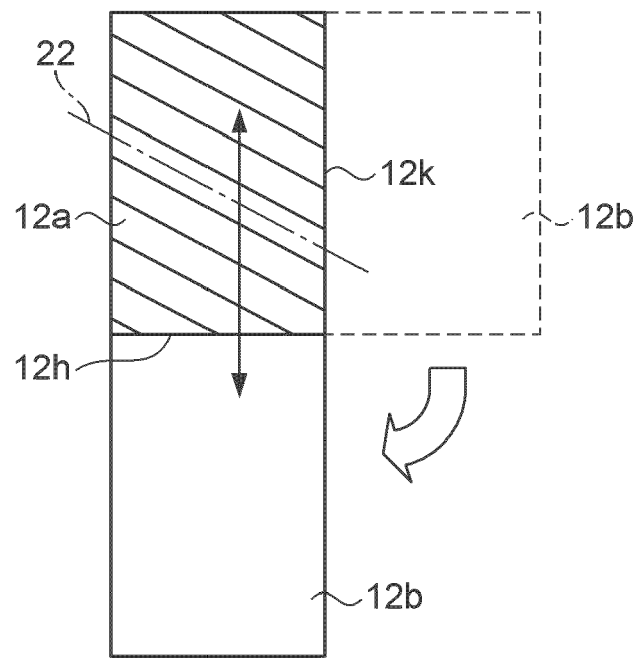
FIGS. 6(a) and 6(b) are schematic diagrams of print mediums of further modifications of the first modification.
Figure 6B:
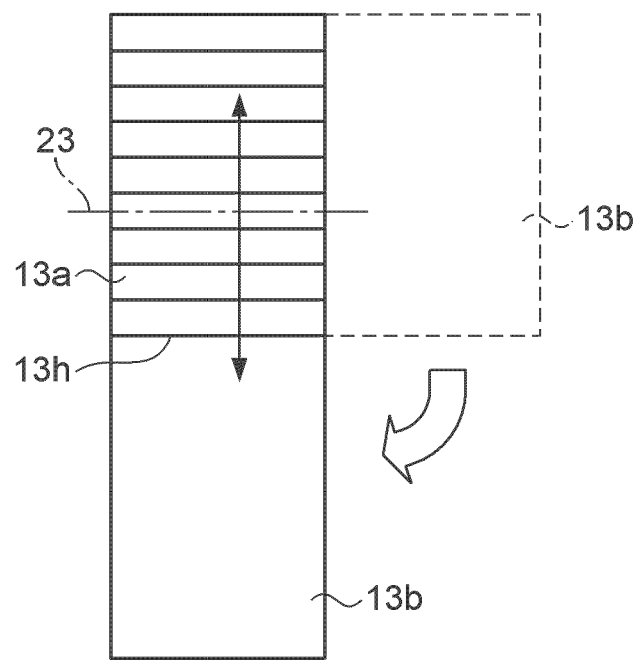

FIG. 6(a) is a schematic diagram of a print medium 10 of this modification. FIG. 6(a) shows a modification corresponding to FIG. 5(c), and FIG. 6(b) shows a modification corresponding to FIG. 5(d). Referring to FIG. 6(a), the cylinder axes 22 of the convex lenses are more parallel to the long side 12k of the lenticular sheet 12a than to a short side 12h. In this case, the extending portion 12b is not formed on the right of the lenticular sheet 12a but under the short side 12h. This allows the carriage to be traveled along the arrow at the printing of an addressee, thus increasing the number of sensed convex lenses to improve the accuracy of the pitch information. The extending portion 12b may not be provided below but above.

Referring to FIG. 6(b), the cylinder axes 23 of the convex lenses are parallel to a short side 13h of the lenticular sheet 13a. Also in this case, the extending portion 13b is not formed on the right but under the short side 13h. This allows the carriage at the printing of an addressee to be traveled along the arrow, thus increasing the number of sensed convex lenses to improve the accuracy of the pitch information. The extending portion 13b may not be provided below but above.

(Second Modification)

As shown in FIG. 1, the print medium of the first embodiment has the components on and under the substrate 30. As a second modification, a print medium may not have at least one of the components.

For example, the ink permeating layer 50 may be omitted. Since the ink permeating layer 50 serves as the base of parallactic images, the ink permeating layer 50 may be omitted when the bonding layer 70 or the print paper 60 has the function of the base.

The ink absorbing layer 40 may be omitted. Since the ink absorbing layer 40 is a component for absorbing ejected ink and holding the ink in ejected positions, the ink absorbing layer 40 may be omitted when the substrate 30 has the function of absorbing the ink and holding it. Furthermore, for example, when ultraviolet-cured ink containing little solvent is used for print ink, the ink absorbing layer 40 is not necessary because there is no need to dispose a component for holding the ink.

Furthermore, the bonding layer 70 and the release sheet 80 may be omitted. For example, when the creator bonds the lenticular sheet to the extending portion with an adhesive, the bonding layer 70 and the release sheet 80 can be omitted. This increases the work of the creator, but with light load because registration for bonding is easy.

As another alternative, the print paper 60 may be omitted. Since the print paper 60 is used for addressing the print paper 60 can be omitted if the substrate 30 is made of a material for addressing.

The print medium 10 according to the second modification may have the lenticular sheet 10a and the substrate 30 as the minimum components if the substrate 30 is made of a material having the function of absorbing ink and fixing it and made of a material for addressing.

(Third Modification)

In the first embodiment, the thicknesses of the components of the print medium 10 are not specified. In contrast, the lenticular sheet 10a and the print paper 60 of the third modification have the same thickness.

This reduces the difference in thickness between the lenticular sheet 10a and the extending portion 10b of FIG. 3. Thus, the clearance between the carriage 90 and the print medium is not changed between the lenticular sheet 10a and the extending portion 10b during the traveling of the carriage. This allows the carriage 90 to travel while holding stable clearance without stopping due to a difference in thickness.

Furthermore, it is preferable that the sum of the thicknesses of the ink permeating layer 50 and the ink absorbing layer 40 be equal to the sum of the thicknesses of the bonding layer 70 and the release sheet 80.

This makes the print medium 10 generally even in thickness, thereby allowing stable feeding by the print-medium feeding means of the printer (not shown), such as a paper feed roller.

Figure 7:
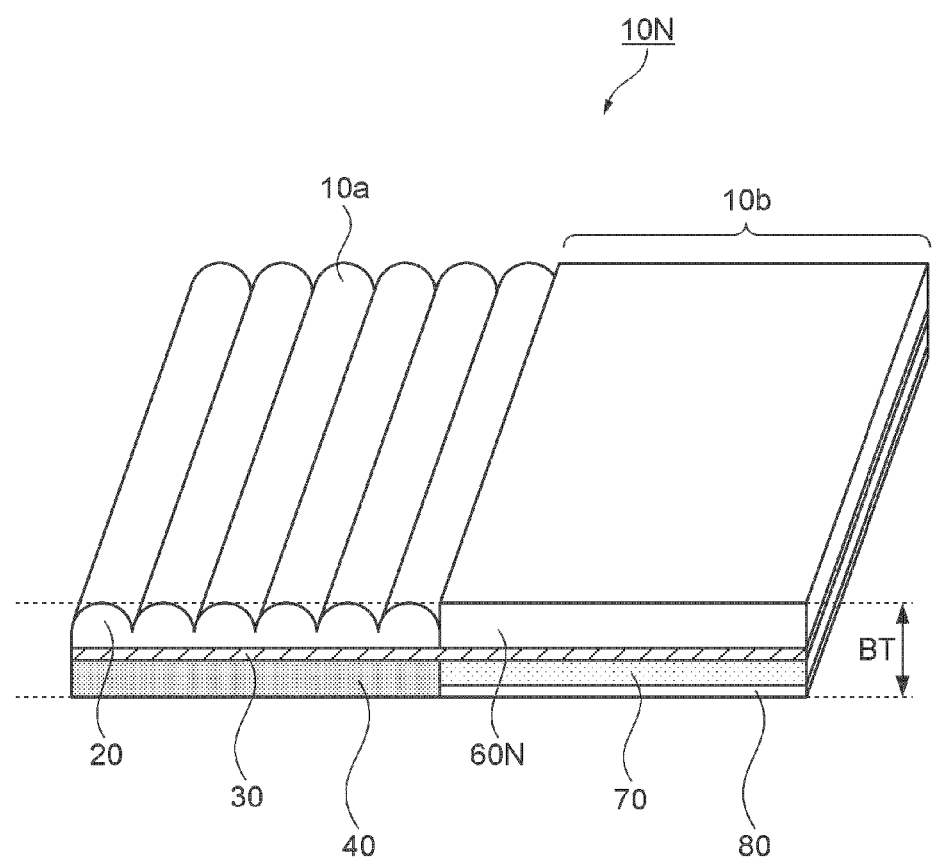
FIG. 7 is a schematic diagram of an example of a print medium incorporating a second modification and a third modification.

FIG. 7 shows an example of a print medium incorporating the second modification and the third modification. The print medium 10N shown in FIG. 7 has no ink permeating layer 50 in comparison with FIG. 1. The extending portion 10b of the substrate 30 has a sheet of print paper 60N of the same thickness as that of the lenticular sheet 10a, under which the bonding layer 70 with the release sheet 80 placed thereunder and the ink absorbing layer 40 of the same thickness are placed side by side. This allows the print medium 10N to have a generally even thickness BT as indicated by the dotted lines.

While the print paper 60N according to the first embodiment shown in FIG. 7 has the same thickness as that of the lenticular sheet 10a, it may not be limited to that and may be adjusted so as to be equal in thickness to the lenticular sheet 10a by superposing a release sheet or another print paper on the surface of the print paper 60 shown in FIG. 1.

Fourth Embodiment

In the first embodiment, the fold is printed on the ink permeating layer 50, as described by reference to FIG. 4. In contrast, the fold may be formed on a component other than the ink permeating layer 50.

The print medium of the second modification has a reduced number of components. This modification corresponds to the second modification and has a fold formed on a component other than the ink permeating layer 50. For example, with no ink permeating layer 50, the fold may be formed on the ink absorbing layer 40. Alternatively, the fold may be formed on the print paper 60 or the substrate 30.

The fold may either be printed on or slit in the substrate 30 at given intervals. This allows the substrate 30 to be easily folded at the slit position, thus enabling the creator to easily fold the extending portion without particular observation of the folded position.

(Fifth Modification)

In the first embodiment, an addressee is printed by a printer, as described by reference to FIG. 3. Alternatively, an addressee may be written by hand by the creator. In this case, a necessary format for a postcard other than an addressee may be printed, such as a zip-code frame. Only the traveling of the carriage for determining the pitch of the convex lenses 20 may be performed.

(Sixth Modification)

In the second embodiment, the second ink absorbing layer 40B and the second ink permeating layer 50B serving as a second print surface for an addressee are provided all over the extending portion 10b. In a sixth modification, the second ink absorbing layer 40B and the second ink permeating layer 50B may be formed only in predetermined areas such as the zip-code frame area 71, the address area 72, the name area 73, and the indication area 74, shown in FIG. 10.

Writing given characters in given areas satisfies the requirements of a postcard. Thus, forming a print surface only on the given area and printing an addressee on the print surface allows addressing. This eliminates the need for a print surface for an addressee across the extending portion 10b of the print medium 10, thereby reducing the amount of the material for the second ink absorbing layer 40B and the second ink permeating layer 50B to reduce the cost of the print medium 10.

(Seventh Modification)

In the second embodiment, an addressee is printed in a mirror image inverted left-to-right as viewed from the front of the drawing, as describe by reference to FIG. 11. As a seventh modification, it may be printed upside down.

For example, for a modification of the first modification shown in FIG. 6(*b*), the extending portion 13b of the print medium is folded longitudinally into a postcard. In this case, when the extending portion 13b is folded onto the lenticular sheet 13a, the addressee printed on the extending portion 13b is inverted upside down. Therefore, the addressee is printed in top-to-bottom inverted characters in advance so as to allow correct reading.

(Eighth Modification)

As shown in FIG. 12, the print medium of the third embodiment has the ink absorbing layer 40 serving as a parallactic-image print surface under the substrate 30. The print paper may be used for a print surface as an eighth modification.

The ink absorbing layer 40 is for absorbing ink ejected to form parallactic images and for fixing the ink onto ejected positions, as described above. The ink absorbing layer 40 is made of fine particles of hydrophilic polymer resin such as polyvinyl alcohol (PVA), a cationic compound, or silica. Therefore, the amount of absorbed ink and the degree of fixation of the ink depend on the material. This may cause a difference in resolution and color between the formed parallactic images and desired images. For example, desired parallactic images equal in quality to a picture cannot be achieved by the ink absorbing layer 40.

Thus, in this case, the eighth modification uses print paper such as inkjet print paper (hereinafter, referred to as photo paper) for a parallactic-image print surface. While general photo paper is glossy or mat, either will do. The photo paper is bonded on the substrate 30 to form a parallactic-image print surface. Any way of bonding may be adopted which allows the substrate 30 and photo paper to be bonded together, such as with an adhesive.

Figure 16:
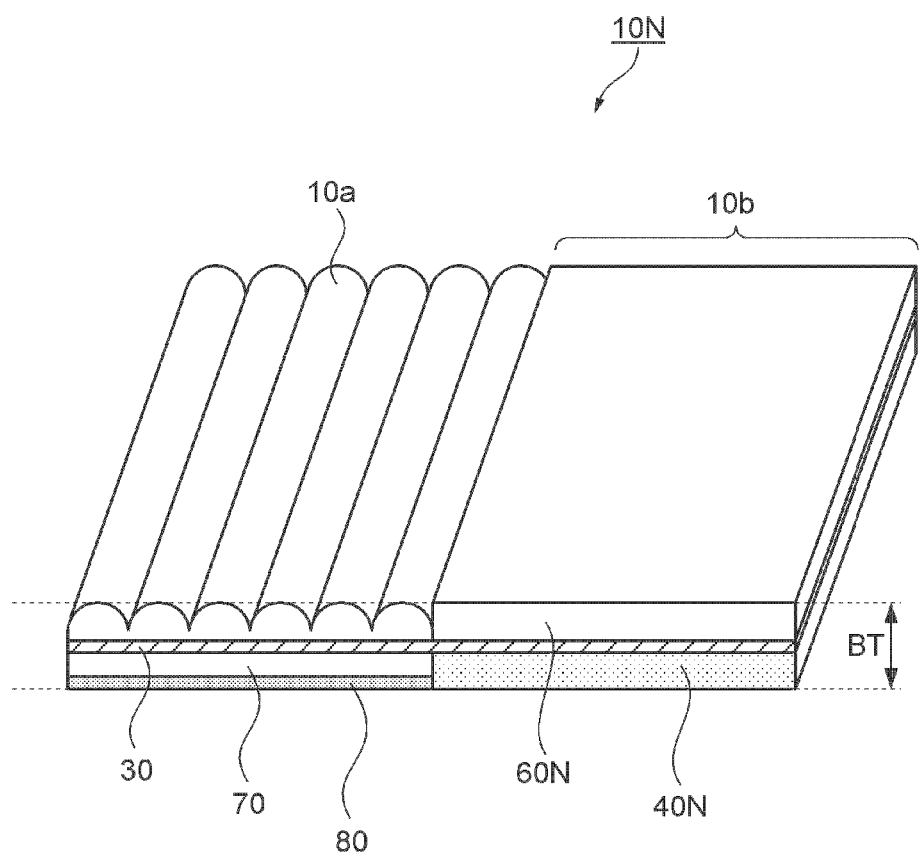
FIG. 16 is a schematic diagram of an example of a print medium incorporating an eighth modification.

FIG. 16 shows an example of a print medium incorporating the eighth modification. The print medium 10N shown in FIG. 16 has print paper 60N of the same thickness as that of the lenticular sheet 10a on the top of the extending portion 10b of the substrate 30, in comparison with FIG. 12, and has print paper 40N, on the bottom, of the same thickness as the sum of the thicknesses of the bonding layer 70 and the release sheet 80 side by side with the release sheet 80.

(Other Modifications)

The surface of the bonding layer 110 may be coated with a release sheet as another modification. This can protect the bonding layer 110 from degradation of bondability due to dirt or the like. When the extending portion 10b is folded to bond to the back surface of the lenticular sheet 10a, the release sheet is first peeled off from the bonding layer 110 before the bonding. Therefore, the release sheet may be made of any material, such as resin or paper, as long as it can be peeled off from the bonding layer 110.

The components of the print medium 10 of the second embodiment, such as the first ink absorbing layer 40A, are shaped like a sheet with a thickness from about several tens to several hundred microns, and the individual thicknesses are not specified. In contrast, referring to FIG. 8, at least the thickness of the first ink absorbing layer 40A may be equal to that of the second ink absorbing layer 40B or the thickness of the first ink permeating layer 50A may be equal to that of the second ink permeating layer 50B. This facilitates the work of forming the components by coating the substrate 30 because of the same thickness.

At least the first ink absorbing layer 40A and the second ink absorbing layer 40B may be made of the same material, or the first ink permeating layer 50A and the second ink permeating layer 50B may be made of the same material. This allows the ink absorbing layers or the ink permeating layers to be formed of the same coating material. Furthermore, this further facilitates the work of forming the ink absorbing layers and the ink permeating layers with the same thickness, respectively, by coating.

In the foregoing embodiments and modifications, the fold is printed on or slit in the components. Alternatively, at least a predetermined clearance may be provided between the first ink permeating layer 50A and the second ink permeating layer 50B or between the first ink absorbing layer 40A and the second ink absorbing layer 40B to form a "fold". This allows a fold to be formed by providing a clearance when forming the layers without the need for printing or forming a slit, thus facilitating formation of a fold. The clearance may be provided to all the portions between the layers or part thereof. Any clearance that the creator can view will do.

The eighth modification uses the print paper 40N in place of the ink absorbing layer 40, as shown in FIG. 16. As another modification, an ink absorbing layer may be formed in place of the print paper 60N for addressing, on which an addressee may be printed.

If the print paper 40N is opaque enough so that parallactic images formed on the print paper 40N cannot easily be viewed from the substrate 30 side, the addressee printed on the ink absorbing layer cannot easily be viewed also from the formed parallactic image side. In this case, a print surface suitable for addressing may be provided by the ink absorbing layer without the use of inkjet print paper for addressing. This allows stable addressee writing on the surface of the substrate 30.

The ink absorbing layer for addressing is made of fine particles of hydrophilic polymer resin such as polyvinyl alcohol (PVA), a cationic compound, or silica, as is the ink absorbing layer 40. When the print medium is used as a postcard, the ink absorbing layer is substantially in white since it serves as an addressing surface or the front surface of the postcard. Since the front surface of a postcard is desirably in white or pale color, the ink absorbing layer may be made of another material that allows ink to pass through and shows light color. While the foregoing embodiments use lenticular lenses for the lenses of the lens sheet, other lenses such as fly-eye lenses and honey-comb lenses may be used as long as they can provide changes in parallactic images which are the effect of the invention.

The invention claimed is:

1. A print medium including a rectangular lens sheet whose front surface has a predetermined lens shape, the print medium comprising:
    a thin-plate substrate fixed to a back surface of the rectangular lens sheet and having an extending portion extending outward beyond the rectangular lens sheet;
    a printing layer fixed adjacent to the rectangular lens sheet on the front surface of the extending portion of the thin-plate substrate;
    wherein the extending portion overlaps the back surface of the lens sheet when the substrate is folded with respect to one side of the rectangular lens sheet, and wherein the printing layer and the rectangular lens sheet have substantially the same thickness.

2. The print medium according to claim 1, wherein the substrate has a first print surface opposite to the surface fixed to the lens sheet and in the range of the back surface of the lens sheet.

3. The print medium according to claim 2, wherein the first print layer has at least an absorbing layer that absorbs print ink.

4. The print medium according to claim 2, wherein the first print layer has a fold serving as a reference for folding the substrate.

5. The print medium according to claim 1, wherein the substrate has a second print layer adjacent to the surface fixed to the lens sheet and on the extending portion of the substrate.

6. The print medium according to claim 5, wherein the second print layer has a fold serving as a reference for folding the substrate.

7. The print medium according to claim 1, wherein the substrate has a bonding layer opposite to the surface fixed to the lens sheet and on the extending portion of the substrate.

8. The print medium according to claim 1, wherein the predetermined lens shape is a lenticular lens having a large number of cylindrical convex lenses arrayed in parallel.

9. The print medium according to claim 8, wherein the extending portion extends outward from the closest side of the four sides of the rectangular lens sheet parallel to the cylinder axis of the convex lens.

10. The print medium according to claim 1, wherein the substrate has a fold serving as a reference for folding the substrate.

11. The print medium according to claim 1, wherein the extending portion has:
    (1) a first print layer opposite to the surface fixed to the lens sheet; and
    (2) a second print layer adjacent to the surface fixed the lens sheet.

12. The print medium according to claim 11, wherein the substrate has a bonding layer opposite to the surface fixed to the lens sheet and in the range of the back surface of the lens sheet.

13. A print medium including a rectangular lens sheet whose front surface has a predetermined lens shape, the print medium comprising:
    a thin-plate substrate fixed to the back surface of the rectangular lens sheet having an extending portion extending outward beyond the range of the back surface of the lens sheet, wherein the substrate has on the surface opposite to the surface fixed to the lens sheet:
    (1) a first print layer in the range of the back surface of the lens sheet; and
    (2) a second print layer on the extending portion of the substrate, wherein the rectangular lens sheet and the second print layer have substantially the same thickness.

14. The print medium according to claim 13, wherein the first print layer has at least a first ink absorbing layer that absorbs print ink.

15. The print medium according to claim 13, wherein the second print layer has at least a second ink absorbing layer that absorbs print ink.

* * * * *

UNITED STATES PATENT AND TRADEMARK OFFICE
CERTIFICATE OF CORRECTION

PATENT NO. : 7,672,053 B2 Page 1 of 1
APPLICATION NO. : 11/682826
DATED : March 2, 2010
INVENTOR(S) : Katsuhito Suzuki, Fumiaki Mukaiyama and Yoichi Tanaka It is certified that error appears in the above-identified patent and that said Letters Patent is hereby corrected as shown below:

On the title page item (30) Foreign Application Priority Data,
change "Apr. 3, 1930" to --Apr. 3, 2006--

Signed and Sealed this

Eleventh Day of May, 2010

David J. Kappos
*Director of the United States Patent and Trademark Office*